United States Patent
Wang et al.

(10) Patent No.: US 10,491,060 B2
(45) Date of Patent: Nov. 26, 2019

(54) EXTERNAL ROTOR MOTOR AND AIR CONDITIONER COMPRISING THE SAME

(71) Applicant: Zhongshan Broad-Ocean Motor Co., Ltd., Zhongshan (CN)

(72) Inventors: Xiongcheng Wang, Zhongshan (CN); Guiwen Fu, Zhongshan (CN); Jincheng Zhu, Zhongshan (CN); Shikun Chen, Zhongshan (CN); Qixiang Xiang, Zhongshan (CN); Chaorong Luo, Zhongshan (CN)

(73) Assignee: ZHONGSHAN BROAD-OCEAN MOTOR CO., LTD., Zhongshan (CN)

( * ) Notice: Subject to any disclaimer, the term of this patent is extended or adjusted under 35 U.S.C. 154(b) by 226 days.

(21) Appl. No.: 15/490,877

(22) Filed: Apr. 18, 2017

(65) Prior Publication Data

US 2017/0222503 A1    Aug. 3, 2017

Related U.S. Application Data

(63) Continuation-in-part of application No. PCT/CN2015/090610, filed on Sep. 24, 2015.

(30) Foreign Application Priority Data

Jan. 21, 2015  (CN) .................... 2015 2 0043515 U
Jan. 21, 2015  (CN) .................... 2015 2 0043548 U
(Continued)

(51) Int. Cl.
*H02K 5/16*     (2006.01)
*H02K 1/22*     (2006.01)
(Continued)

(52) U.S. Cl.
CPC .............. *H02K 1/22* (2013.01); *F24F 1/22* (2013.01); *F24F 7/007* (2013.01); *H02K 1/2786* (2013.01);
(Continued)

(58) Field of Classification Search
CPC ...... H02K 5/173; H02K 5/161; H02K 5/1672; H02K 5/1732; H02K 5/167; H02K 1/16;
(Continued)

(56) References Cited

U.S. PATENT DOCUMENTS 7,911,089 B2 * 3/2011 Jang ..................... F04D 25/08
                                                            310/43
7,986,067 B2 * 7/2011 Yano ........................ H02K 5/24
                                                            310/43
(Continued)

FOREIGN PATENT DOCUMENTS

CN       203193434 U    9/2013
CN       204408035 U    6/2015
(Continued)

OTHER PUBLICATIONS

English machine translation of Wang, CN 204408112 (Year: 2015).*

*Primary Examiner* — Burton S Mullins
(74) *Attorney, Agent, or Firm* — Matthias Scholl P.C.; Matthias Scholl

(57) ABSTRACT

An external rotor motor, including a rotary shaft, a plastic-packaged stator, and an external rotor. The plastic-packaged stator includes a sleeve base, a stator core, a terminal insulator, coil windings, and a plastic-packaged body. The plastic-packaged stator is disposed in the chamber of the external rotor. The terminal insulator is disposed on the end surface of the stator core. The coil windings are coiled on the terminal insulator. The sleeve base is disposed in an axle hole of the stator core. The plastic-packaged body integrates
(Continued)

the sleeve base, the stator core, the terminal insulator, and the coil windings. A plastic-packaged end plate is disposed on the plastic-packaged body on one side of the stator core. Bearing housings are disposed on two ends of the sleeve base. The rotary shaft is disposed in the sleeve base, and two ends of the rotary shaft are supported by bearings.

27 Claims, 24 Drawing Sheets

(30) Foreign Application Priority Data

| Jan. 21, 2015 | (CN) | 2015 2 0043550 U |
|---|---|---|
| Apr. 10, 2015 | (CN) | 2015 2 0213499 U |
| Jun. 23, 2015 | (CN) | 2015 2 0435300 U |
| Jun. 23, 2015 | (CN) | 2015 2 0435422 U |
| Jun. 23, 2015 | (CN) | 2015 2 0435462 U |

(51) Int. Cl.

| H02K 5/173 | (2006.01) |
|---|---|
| H02K 1/27 | (2006.01) |
| F24F 1/22 | (2011.01) |
| F24F 7/007 | (2006.01) |
| H02K 7/08 | (2006.01) |
| H02K 7/14 | (2006.01) |

(52) U.S. Cl.
CPC ............... *H02K 5/16* (2013.01); *H02K 5/173* (2013.01); *H02K 7/08* (2013.01); *H02K 7/14* (2013.01); *H02K 5/1732* (2013.01)

(58) Field of Classification Search
CPC .. H02K 1/12; H02K 1/14; H02K 5/16; H02K 1/2786
USPC .............. 310/43, 67 R, 90, 216, 21, 216.074
See application file for complete search history.

(56) References Cited

U.S. PATENT DOCUMENTS

| 7,994,663 | B2* | 8/2011 | Harata | H02K 1/187 |
|---|---|---|---|---|
| | | | | 310/43 |
| 8,987,958 | B2* | 3/2015 | Chen | H02K 1/185 |
| | | | | 310/43 |
| 2009/0196773 | A1* | 8/2009 | Jiang | F04D 29/059 |
| | | | | 417/423.14 |
| 2010/0019586 | A1* | 1/2010 | Lu | H02K 5/08 |
| | | | | 310/43 |
| 2011/0072844 | A1* | 3/2011 | Wang | F24F 1/38 |
| | | | | 62/427 |

FOREIGN PATENT DOCUMENTS

| CN | 204408074 U | | 6/2015 | |
|---|---|---|---|---|
| CN | 204408112 U | | 6/2015 | |
| CN | 204610321 U | | 9/2015 | |
| JP | 04-190651 | * | 7/1992 | ............... H02K 5/16 |
| WO | 00/11775 | * | 3/2000 | ............... H02K 1/16 |

* cited by examiner

EXTERNAL ROTOR MOTOR AND AIR CONDITIONER COMPRISING THE SAME

CROSS-REFERENCE TO RELATED APPLICATIONS

This application is a continuation-in-part of International Patent Application No. PCT/CN2015/090610 with an international filing date of Sep. 24, 2015, designating the United States, now pending, and further claims foreign priority benefits to Chinese Patent Application No. 201520043550.1 filed Jan. 21, 2015, Chinese Patent Application No. 201520043548.4 filed Jan. 21, 2015, Chinese Patent Application No. 201520043515.X filed Jan. 21, 2015, Chinese Patent Application No. 201520213499.4 filed Apr. 10, 2015, Chinese Patent Application No. 201520435422.1 filed Jun. 23, 2015, Chinese Patent Application No. 201520435300.2 filed Jun. 23, 2015, and Chinese Patent Application No. 201520435462.6 filed Jun. 23, 2015. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, and Cambridge, Mass. 02142.

BACKGROUND OF THE INVENTION

Field of the Invention

The invention relates to an external rotor motor and an air conditioner comprising the same.

Description of the Related Art

As shown in FIG. 1, a conventional external rotor motor includes a rotary shaft 1, a plastic-packaged stator 2, and an external rotor 3. The rotary shaft 1 is mounted on the plastic-packaged stator 2 via bearings. The plastic-packaged stator 2 is disposed in the chamber of the external rotor 3. One end of the rotary shaft 1 protrudes outside from the center of the plastic-packaged stator 2, is connected to the external rotor 3, and then extends out from the center of the external rotor 3 to form a shaft extension A10 on which the fan blades are mounted. The external rotor and the fan blades are arranged on the same side of the plastic-packaged stator, leading to the following problems:

1) the external rotor motor is not balanced and is unstable during rotation;
2) air conditioners that include the external rotor motor are bulky; and
3) a significant amount of noise is produced during the operation of the external rotor motor.

SUMMARY OF THE INVENTION

In view of the above-described problems, it is one objective of the invention to provide an external rotor motor that features balanced rotation and stable performance.

It is another objective of the invention to provide an air conditioner featuring compact structure and stable performance.

To achieve the above objectives, in accordance with one embodiment of the invention, there is provided an external rotor motor, comprising a rotary shaft, a plastic-packaged stator, and an external rotor. The plastic-packaged stator is disposed in a chamber of the external rotor. The plastic-packaged stator comprises a sleeve base, a stator core, a terminal insulator, coil windings, and a plastic-packaged body. The terminal insulator is disposed on an end surface of the stator core. The coil windings are coiled on the terminal insulator. The sleeve base is disposed in an axle hole of the stator core. The plastic-packaged body integrates the sleeve base, the stator core, the terminal insulator, and the coil windings. A plastic-packaged end plate is disposed on the plastic-packaged body on one side of the stator core. Bearing housings are disposed on two ends of the sleeve base. Each bearing housing comprises bearings. The rotary shaft is disposed in the sleeve base, and two ends of the rotary shaft are supported by the bearings. Two ends of the rotary shaft protrude outwards from the sleeve base. One end of the rotary shaft is inserted in the chamber and is connected to the external rotor, and the other end protrudes outwards from a center hole of the plastic-packaged end plate to form a shaft extension connected to a load.

In a class of this embodiment, a plurality of mounting feet is disposed on an edge of the plastic-packaged end plate. The mounting feet comprise mounting holes. An annular lug boss is disposed on a center of a top surface of the plastic-packaged end plate. The rotary shaft protrudes from a center of the annular lug boss. A plurality of first reinforcing ribs is disposed on the top surface of the plastic-packaged end plate. One end of each first reinforcing rib is connected to an outer edge of the annular lug boss, and the other end is connected to a top surface of the mounting feet.

In a class of this embodiment, a circular flanging is disposed on an outer edge of a bottom surface of the plastic-packaged end plate. The circular flanging is sleeved on a top of the external rotor.

In a class of this embodiment, the stator core comprises a plurality of laminated punching sheets. The laminated punching sheets each comprise a circular yoke, and a plurality of first tooth portions and second tooth portions on an outer edge of the circular yoke. The first tooth portions and the second tooth portions are circumferentially arranged at intervals. The second tooth portions each comprise a tooth root, a first curved tooth, a straight tooth, and a second curved tooth. The first curved tooth, the straight tooth, and the second curved tooth extend out from the tooth root. The straight tooth is configured to separate the first curved tooth from the second curved tooth, and first winding slots are formed therebetween. Second winding slots are formed between each second tooth portion and an adjacent first tooth portion. A depth of the first winding slots along a radial direction of the laminated punching sheets is smaller than a depth of the second winding slots along the radial direction of the laminated punching sheets. A width of the tooth root is greater than a width of the straight tooth.

In a class of this embodiment, the first curved tooth and the second curved tooth each comprise a baffle portion towards the straight tooth at an opening of the first winding slots. A notch is formed between the baffle portion and the straight tooth. The notch is in the vicinity of the straight tooth. Middle parts of side surfaces of the first curved tooth and the second curved tooth are circular arc. The tooth root of the second tooth portions comprises a segment of the straight tooth.

In a class of this embodiment, a slot bottom of the second winding slots is circular-arc, and is centered around a center of the laminated punching sheets.

In a class of this embodiment, the external rotor motor further comprises a thermostat and a fixing frame. The fixing frame comprises an annular portion and a clamping portion. The clamping portion bulges outwards from the annular portion. A cylindrical body is disposed in a center of the terminal insulator. The annular portion is sleeved on the cylindrical body, and the clamping portion is disposed on the coil windings. The thermostat is disposed on the clamping portion and is in the vicinity of the coil windings.

In a class of this embodiment, the clamping portion is provided with mounting slots. The thermostat is mounted in the mounting slot. A bottom of the mounting slot is a through hole, and the thermostat is in the vicinity of the coil windings. The clamping portion is provided with a fixing block. The fixing block is configured to fix the thermostat in the mounting slot. Two sides of the clamping portion are provided with slots, and a top surface of the terminal insulator is provided with cylinders. The cylinders are secured to the slots.

In a class of this embodiment, a plurality of positioning blocks is disposed on the top surface of the terminal insulator. Fixing grooves form between two positioning blocks, and the fixing grooves are configured to fix enameled wires. Part of the positioning blocks are circumferentially arranged along a periphery of the cylindrical body, and the annular portion is configured to fix the enameled wires in the vicinity of the cylindrical body in the fixing grooves. A plurality of bumps is disposed on an outer edge of the top surface of the terminal insulator, and the bumps are configured to limit the coil windings within a range of the stator core.

In a class of this embodiment, one end of an outer side of the sleeve base which is in the vicinity of the plastic-packaged end plate is provided with a plurality of second reinforcing ribs in a radial direction. The plastic-packaged body is sleeved on the second reinforcing ribs.

In a class of this embodiment, two adjacent second reinforcing ribs form a pair of second reinforcing ribs, and the pair of second reinforcing ribs is V-shaped. A connecting member is disposed between the two adjacent second reinforcing ribs and on one end of the sleeve base. The connecting member is configured to connect the two adjacent second reinforcing ribs. The second reinforcing ribs protrudes out from an outer side surface of the stator core along the radial direction.

In a class of this embodiment, the second reinforcing ribs are bended from an end surface of the sleeve base. The sleeve base is cast from aluminum.

In a class of this embodiment, the sleeve base is metal material. The sleeve base is disposed in the axle hole and matches with an inner wall of the axle hole. The bearing is disposed in the sleeve base, and at least part of the bearing is inserted in the axle hole in a center of the stator core.

In a class of this embodiment, the sleeve base comprises a first sleeve base and a second sleeve base. The first sleeve base and the second sleeve base are disposed at two ends of the axle hole. The first sleeve base and the second sleeve base each are provided with the bearing, and at least part of the bearing is inserted in the axle hole of the stator core. The first sleeve base and the second sleeve base both comprise a sleeve portion and a flanging portion. One end of the flanging portion protrudes outwards from the sleeve portion. The bearing housing configured to mount the bearing is disposed in the sleeve portion. Part of the plastic-packaged body is configured to fix the flanging portion on an end surface of the stator core.

In a class of this embodiment, the sleeve base comprises the sleeve portion and the flanging portion. One end of the flanging portion protrudes outwards from the sleeve portion. The sleeve portion is disposed in the axle hole. Part of the plastic-packaged body is configured to fix the flanging portion on the end surface of the stator core. Two ends of the sleeve portion are provided with the bearing housings, and the bearing housings are configured to mount the bearing. At least part of the bearing is inserted in the axle hole of the stator core.

In a class of this embodiment, a mounting portion is disposed at an outer edge of the plastic-packaged end plate, and the mounting portion is configured to mount a buffer ring. The mounting portion comprises a plurality of the mounting feet, and the mounting feet are circumferentially arranged at intervals, or the mounting portion is a circular flange.

Another embodiment of the invention provides an air conditioner comprising the external rotor motor.

Advantages of the external rotor motor and the air conditioner according to embodiments of the invention are summarized as follows:

1. Two ends of the rotary shaft protrude outwards from the sleeve base. One end of the rotary shaft is inserted in the chamber and is connected to the external rotor, and the other end protrudes outwards from the center hole of the plastic-packaged end plate to form a shaft extension connected to a load. The rotating external rotor and the load which is mounted on the shaft extension of the rotary shaft are on two sides of the plastic-packaged stator, thus the motor features balanced rotation and stable performance.

2. The top surface of each mounting feet is connected to the outer edge of the annular lug boss via two first reinforcing ribs. The arrangement is simple, and the structural strength of the motor is improved. In addition, the noises produced during operation are reduced.

3. The second tooth portions each comprise a tooth root, a first curved tooth, a straight tooth, and a second curved tooth. The first curved tooth, the straight tooth, and the second curved tooth extend out from the tooth root. The straight tooth is configured to separate the first curved tooth from the second curved tooth, and first winding slots are formed therebetween. Second winding slots are formed between each second tooth portion and an adjacent first tooth portion, therefore, overlaps between the primary and the secondary coil windings are reduced and avoided, thus facilitating the winding and wiring. Ends of the primary and the secondary coil windings are shorter, and the copper consumption of the primary and the secondary coil windings is reduced, thus saving costs.

4. On the same area of the silicon steel sheets, the first winding slots and the second winding slots can be made greater, and the distance between the slots can be shorter, thus the consumption of the copper-enameled wire is reduced, and the cost is lower.

5. The second tooth portions each comprise a tooth root, a first curved tooth, a straight tooth, and a second curved tooth. The first curved tooth, the straight tooth, and the second curved tooth extend out from the tooth root. The width of tooth is increased, and the magnetic flux density of the stator is lowered, thus the distribution of magnetic field is uniform, and the efficiency and performance of the motor are improved.

6. The fixing frame comprises an annular portion and a clamping portion. The clamping portion bulges outwards from the annular portion. A cylindrical body is disposed in a center of the terminal insulator. The annular portion is sleeved on the cylindrical body, and the clamping portion is disposed on the coil windings. The thermostat is disposed on the clamping portion and is in the vicinity of the coil windings. The arrangement is simple. The thermostat is reliable and can quickly sense the temperature.

7. The clamping portion is provided with mounting slots. The thermostat is mounted in the mounting slot. A bottom of the mounting slot is a through hole, and the thermostat is in the vicinity of the coil windings. The thermostat which features higher measuring accuracy can quickly sense the temperature and protect the plastic-packaged stator. The clamping portion is provided with a fixing block. The fixing block is configured to fix the thermostat in the mounting slot. The arrangement is simple, and the assembly is reliable. Two sides of the clamping portion are provided with slots, and a top surface of the terminal insulator is provided with cylinders. The cylinders are secured to the slots. The arrangement is simple, and the positioning and the assembly are convenient.

8. One end of the outer side of the sleeve base in the vicinity of the plastic-packaged end plate is provided with a plurality of second reinforcing ribs in the radial direction. The plastic-packaged body is sleeved on the second reinforcing ribs, therefore, the bonding strength between the sleeve base and the plastic-packaged body is enhanced, and the risk of the plastic-packaged body detaching from the sleeve base is lowered; the reliability of the plastic-packaged stator is improved, and the service life of the plastic-packaged stator is prolonged. In addition, the second reinforcing ribs can be used for heat dissipation. The heat generated by the bearing during the high-speed operation can be dissipated via the second reinforcing ribs and the plastic-packaged body, so as to avoid adverse effect of high temperature on the bearing.

9. Two adjacent second reinforcing ribs form a pair of second reinforcing ribs, and the pair of second reinforcing ribs is V-shaped. A connecting member is disposed between the two adjacent second reinforcing ribs and on one end of the sleeve base. The connecting member is configured to connect the two adjacent second reinforcing ribs. The second reinforcing ribs protrudes out from an outer side surface of the stator core along the radial direction. The arrangement is simple, and the bonding strength between the sleeve base and the plastic-packaged body is enhanced, thus the risks of the plastic-packaged body detaching from the sleeve base is lowered, and the reliability of the plastic-packaged stator is improved.

10. The sleeve base is metal material. The sleeve base is disposed in the axle hole and matches with an inner wall of the axle hole. The arrangement is simple, and the assembly of the sleeve base is convenient, accurate, and reliable. The coaxiality of the bearing is effectively enhanced, and the vibration and noises produced during the operation of the motor are reduced. The bearing is disposed in the sleeve base, and at least part of the bearing is inserted in the axle hole in a center of the stator core. The heat generated by the bearing during operation can be dissipated via the sleeve base and the stator core, and the heat dissipation potential of the bearing is enhanced, thus the heat dissipation problem of the bearing in the external rotor motor is effectively solved. The motor is reliable, and the service life thereof is prolonged.

11. The external rotor motor is mounted in the outdoor unit of the air conditioner via the mounting portion on the outer edge of the plastic-packaged end plate. The arrangement is simple. The mounting position is only one in number, thus the buffer ring and the mounting support are reduced, and the production cost is saved.

BRIEF DESCRIPTION OF THE DRAWINGS

The invention is described hereinbelow with reference to the accompanying drawings, in which.

DETAILED DESCRIPTION OF THE EMBODIMENTS

Figure 1:
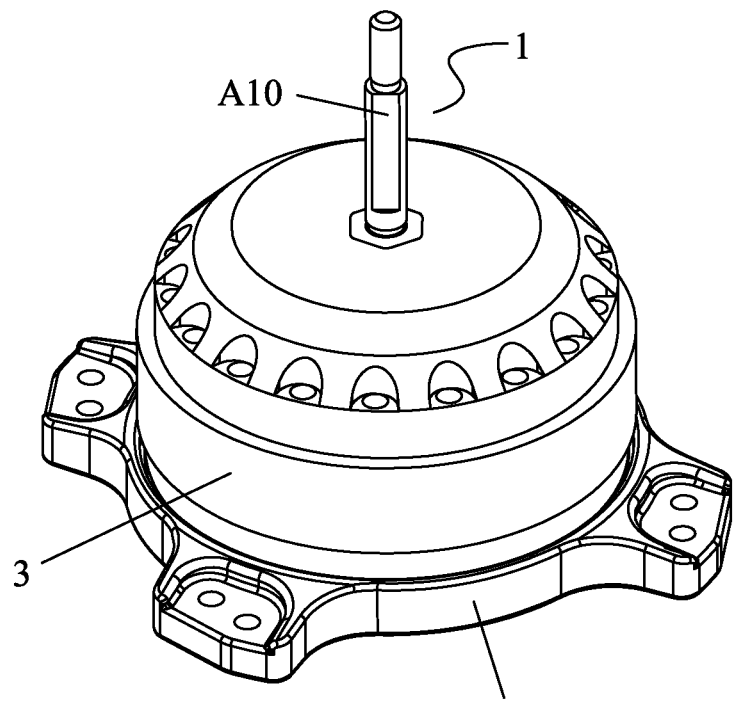
FIG. 1 is a stereogram of an external rotor motor in the prior art.
Figure 2:
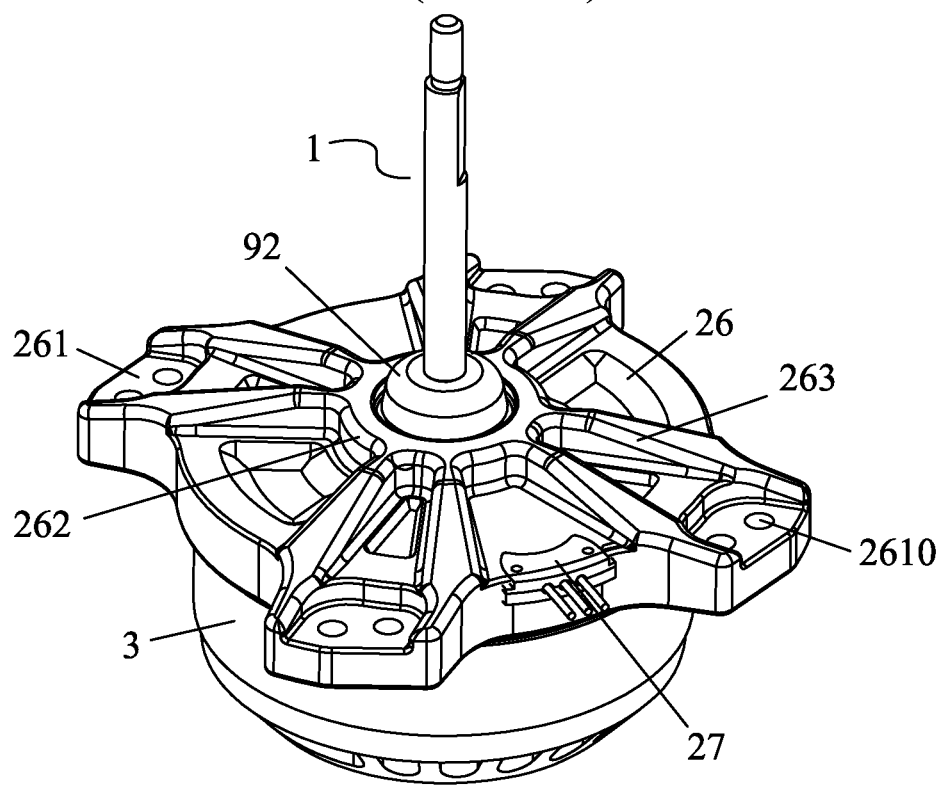
FIG. 2 is a stereogram of an external rotor motor in Example 1.
Figure 3:
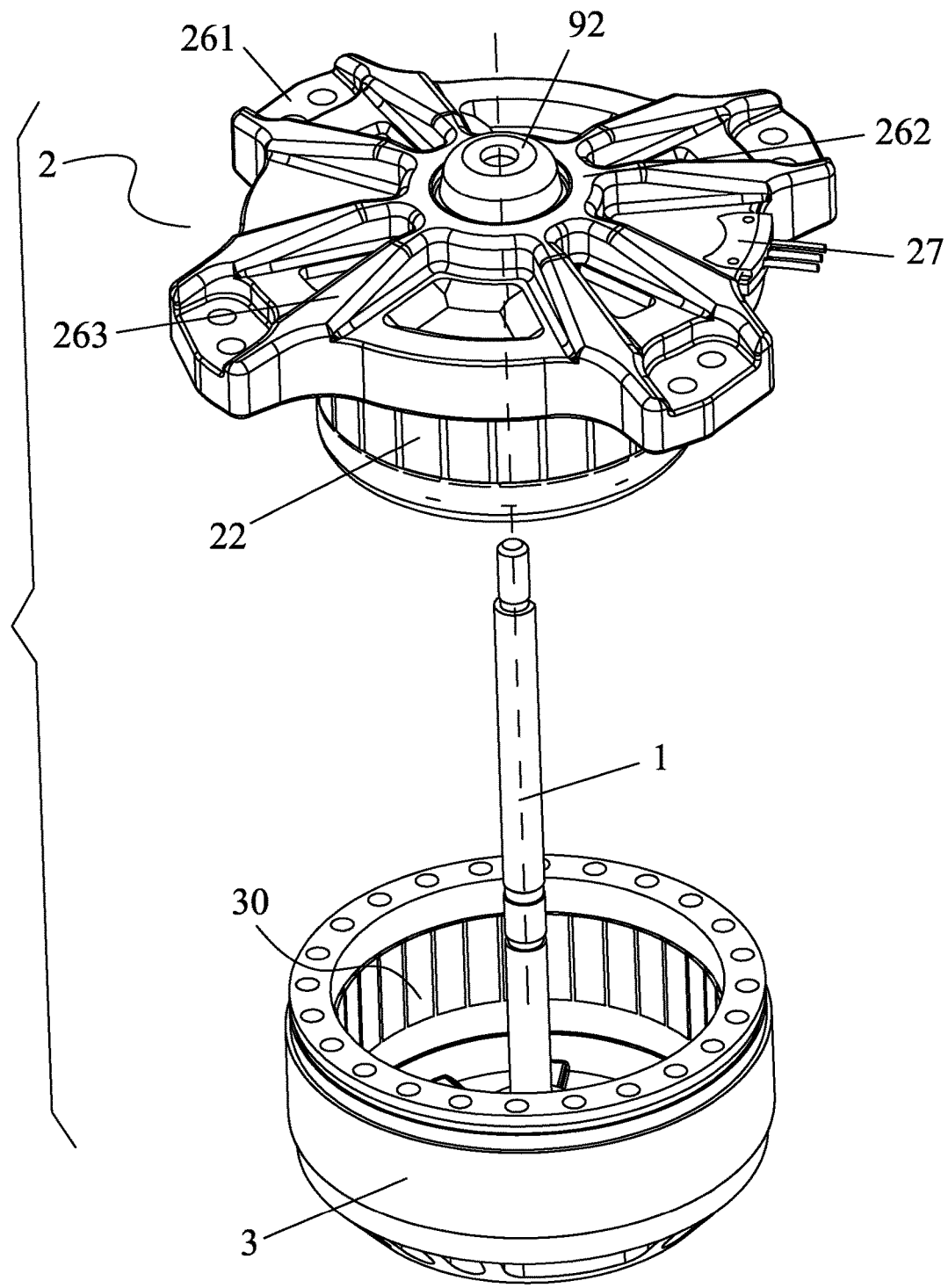
FIG. 3 is an exploded view of an external rotor motor in Example 1.
Figure 4:
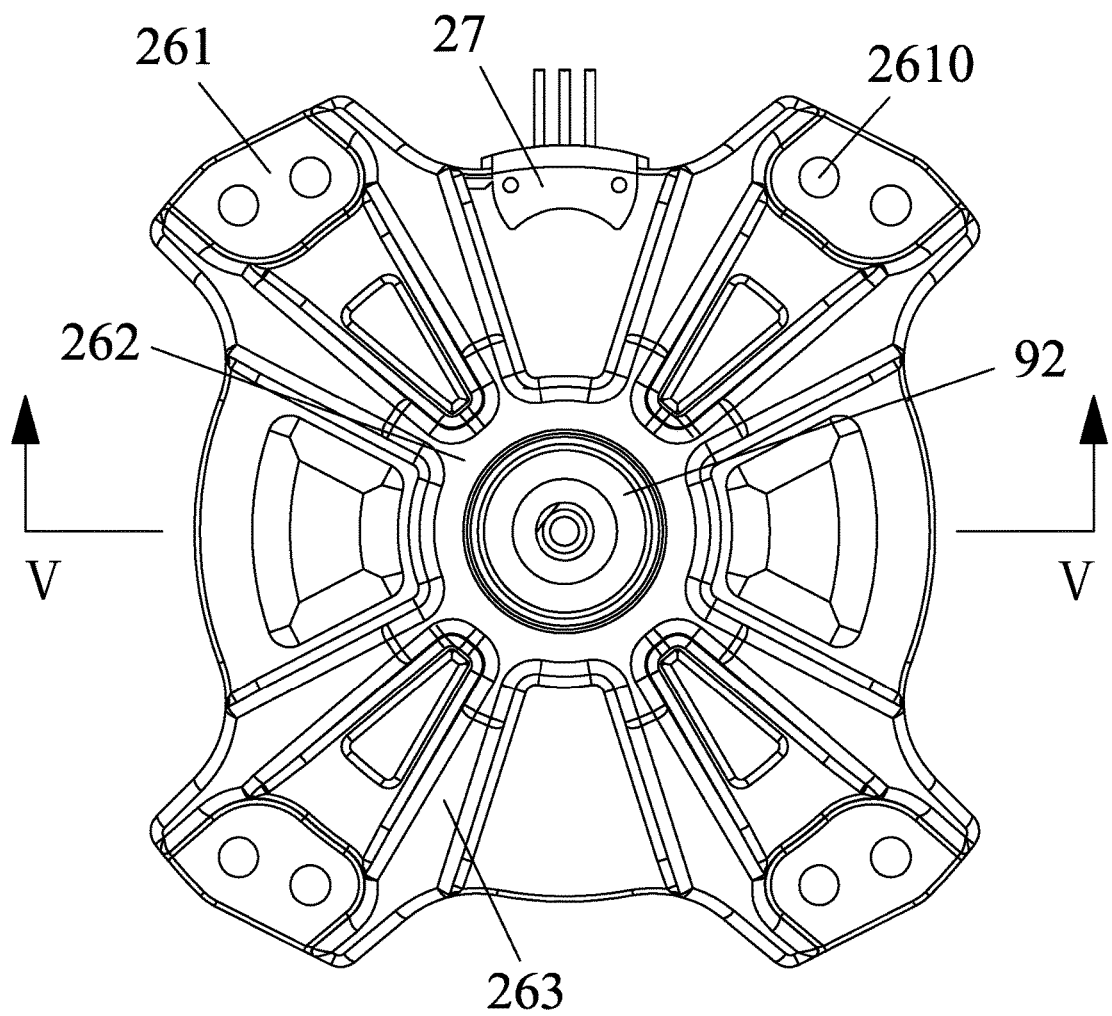
FIG. 4 is a top view of an external rotor motor in Example 1.
Figure 5:
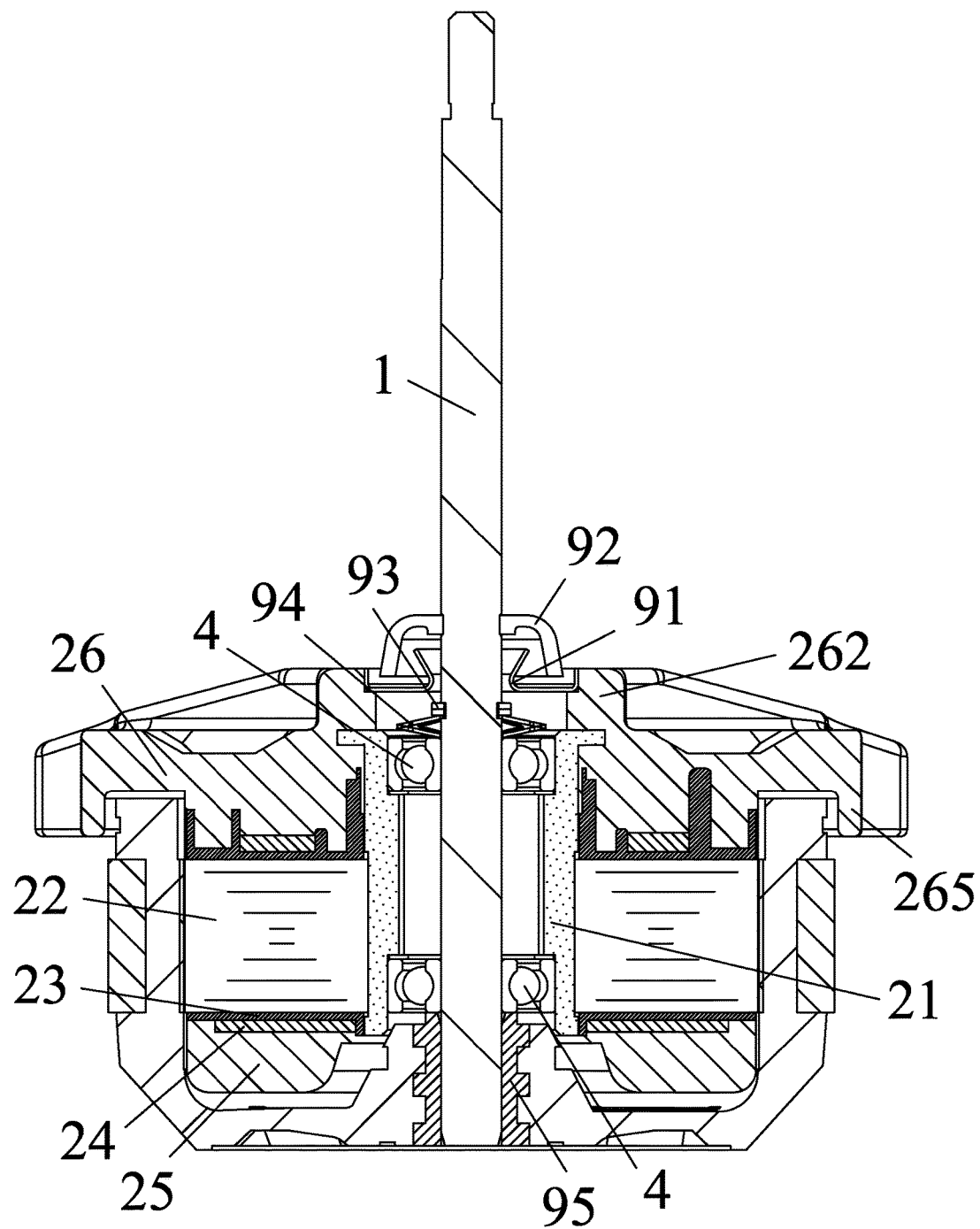
FIG. 5 is a cross-sectional view taken from line V-V in FIG. 4.

For further illustrating the invention, experiments detailing an external rotor motor and an air conditioner comprising the same are described below.

Example 1

As shown in FIGS. 2-5, an external rotor motor comprises a rotary shaft 1, a plastic-packaged stator 2, and an external rotor 3. The plastic-packaged stator 2 is disposed in a chamber 30 of the external rotor 3. The plastic-packaged stator 2 comprises a sleeve base 21, a stator core 22, a terminal insulator 23, coil windings 24, and a plastic-packaged body 25. The terminal insulator 23 is disposed on an end surface of the stator core 22. The coil windings 24 are coiled on the terminal insulator 23. The sleeve base 21 is disposed in an axle hole 220 of the stator core 22. The plastic-packaged body 25 integrates the sleeve base 21, the stator core 22, the terminal insulator 23, and the coil windings 24. A plastic-packaged end plate 26 is disposed on the plastic-packaged body 25 on one side of the stator core 22. Bearing housings are disposed on two ends of the sleeve base 21. Each bearing housing comprises bearings 4. The rotary shaft 1 is disposed in the sleeve base 21, and two ends of the rotary shaft are supported by the bearings 4. Two ends of the rotary shaft 1 protrude outwards from the sleeve base 21. One end of the rotary shaft is inserted in the chamber 30 and is connected to the external rotor 3, and the other end protrudes outwards from a center hole of the plastic-packaged end plate 26 to form a shaft extension. The shaft extension is connected to a load. A plurality of mounting feet 261 is disposed on an edge of the plastic-packaged end plate 26. The mounting feet 261 comprise mounting holes 2610. An annular lug boss 262 is disposed on a center of a top surface of the plastic-packaged end plate 26. The rotary shaft 1 protrudes from a center of the annular lug boss 262. A plurality of first reinforcing ribs 263 is disposed on the top surface of the plastic-packaged end plate 26. One end of each first reinforcing rib 263 is connected to an outer edge of the annular lug boss 262, and the other end is connected to a top surface of the mounting feet 261.

The mounting feet 261 are four in number. The mounting feet 261 are circumferentially arranged. The top surface of each mounting feet 261 is connected to the outer edge of the annular lug boss 262 via two first reinforcing ribs 263. A dust cap 91 is disposed on a top surface of the lug boss 262. A top of the dust cap 91 is trumpet-shaped. A water-proof ring 92 is disposed on the rotary shaft 1 on an upper part of the dust cap 91. The water-proof ring 92 is sleeved on the dust cap 91. An elastic retaining ring 93 is disposed on the rotary shaft 1 in the middle of the plastic-packaged end plate 26. An elastic gasket 94 is disposed on the rotary shaft 1 below the elastic retaining ring 93. The elastic retaining ring 93 compresses the elastic gasket 94, and the elastic gasket 94 is driven to fix the bearing 4 in the bearing housing. The plastic-packaged stator 2 further comprises a wire clamp 27. The plastic-packaged body 25 is sleeved on part of the wire clamp 27. A leading-out wire of the plastic-packaged stator 2 is lead out from the wire clamp 27. A circular flanging 265 is disposed on an outer edge of a bottom surface of the plastic-packaged end plate 26. The circular flanging 265 is sleeved on a top of the external rotor 3. A shaft sleeve 95 is disposed in the external rotor 3. One end of the rotary shaft 1 is inserted in the shaft sleeve 95, and the rotary shaft 1 is connected to the external rotor 3 via the shaft sleeve 95.

Example 2

Figure 6:
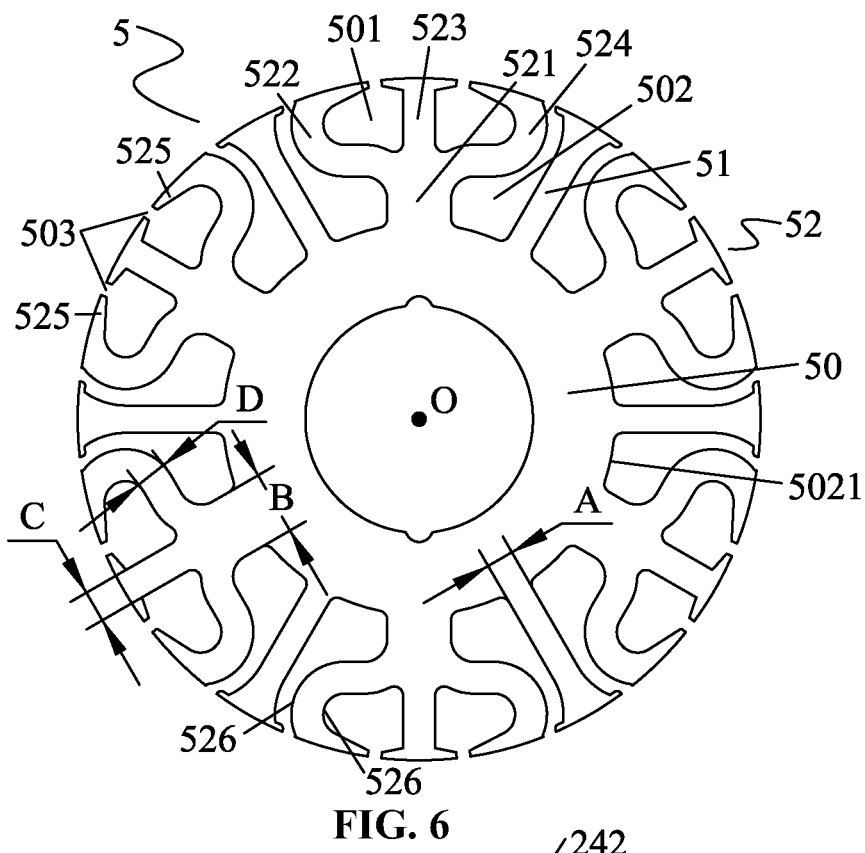
FIG. 6 is a schematic diagram of one stator punching sheet in Example 2.

As shown in FIG. 6, the stator core 22 comprises a plurality of laminated punching sheets 5. The laminated punching sheets 5 each comprise a circular yoke 50, and a plurality of first tooth portions 51 and second tooth portions 52 on an outer edge of the circular yoke 50. The first tooth portions 51 and the second tooth portions 52 are circumferentially arranged at intervals. The second tooth portions 52 each comprise a tooth root 521, a first curved tooth 522, a straight tooth 523, and a second curved tooth 524. The first curved tooth, the straight tooth, and the second curved tooth extend out from the tooth root 521. The straight tooth 523 is configured to separate the first curved tooth 522 from the second curved tooth 524, and first winding slots 501 are formed therebetween. Two second winding slots 502 are formed between the tooth root 521, the first curved tooth 522, the second curved tooth 524 of the second tooth portions 52 and the adjacent first tooth portion 51. A depth of the first winding slots 501 along a radial direction of the laminated punching sheets 5 is smaller than a depth of the second winding slots 502 along the radial direction of the laminated punching sheets 5. A width of the tooth root 521 is greater than a width of the straight tooth 523.

A width A of the first tooth portion 51 is between 1.5-7.0 mm. A width B of the tooth root 521 is between 4.0-12.0 mm. A width C of the straight tooth 523 is between 2.0-8.0 mm. A width D of the first curved tooth and the second curved tooth is between 2.0-8.0 mm. The first curved tooth 522 and the second curved tooth 524 each comprise a baffle portion 525 towards the straight tooth 523 at an opening of the first winding slots 501. A notch 503 is formed between the baffle portion 525 and the straight tooth 523. The notch 503 is in the vicinity of the straight tooth 523. Middle parts of side surfaces of the first curved tooth 522 and the second curved tooth 524 are circular arc structures 526. The tooth root 521 of the second tooth portion 52 comprises a segment of the straight tooth. Two first winding slots 501 are two D-shaped open slots and are symmetrical about the straight tooth 523. Two second winding slots 502 are two d-shaped open slots and are symmetrical about the first tooth portion 51. A slot bottom 5021 of the second winding slots 502 is circular-arc, and is centered around a center O of the laminated punching sheets 5.

Figure 7:
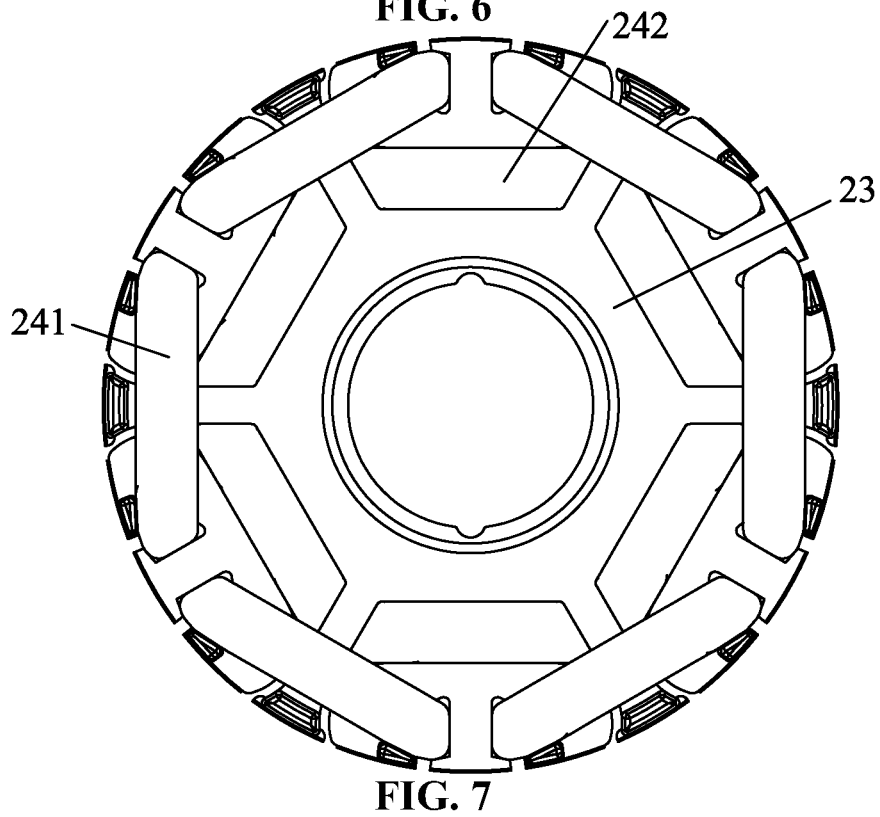
FIG. 7 is a diagram showing an assembly of a stator core and coil windings in Example 2.
Figure 8:
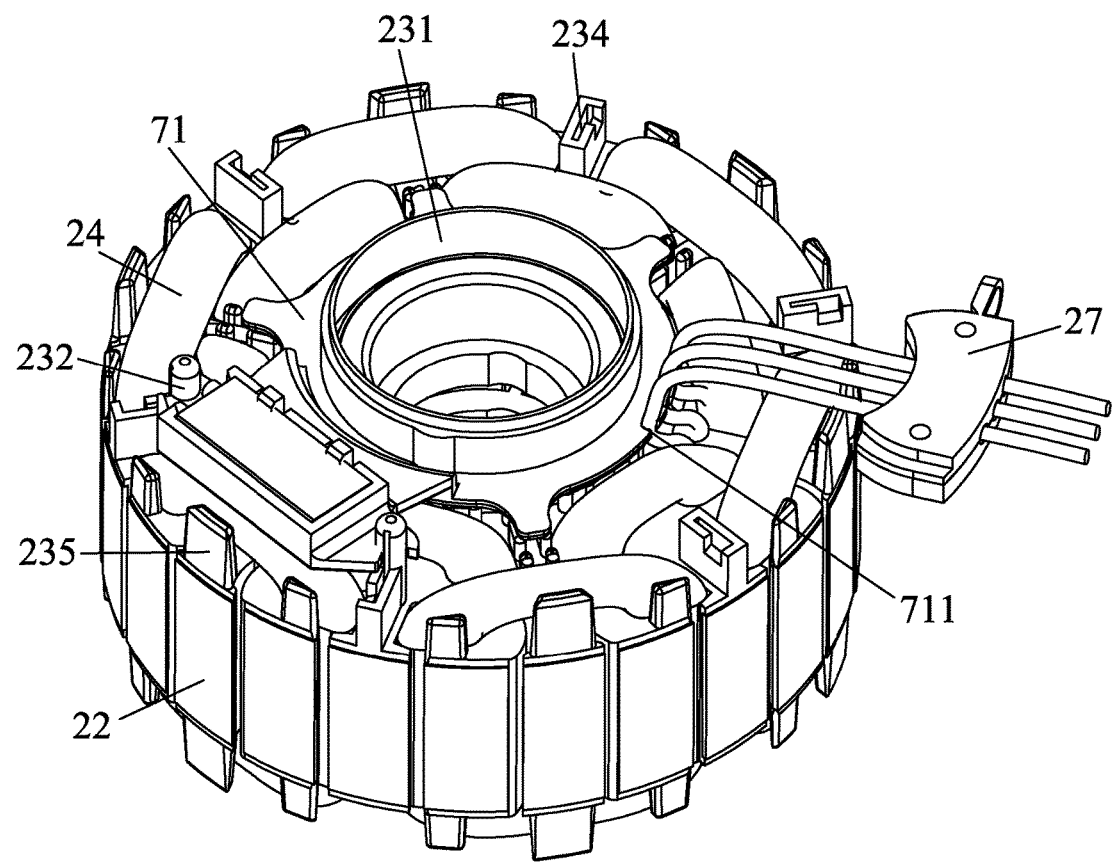
FIG. 8 is a stereogram of a plastic-packaged stator when a plastic-packaged body is not yet installed in Example 3.
Figure 9:
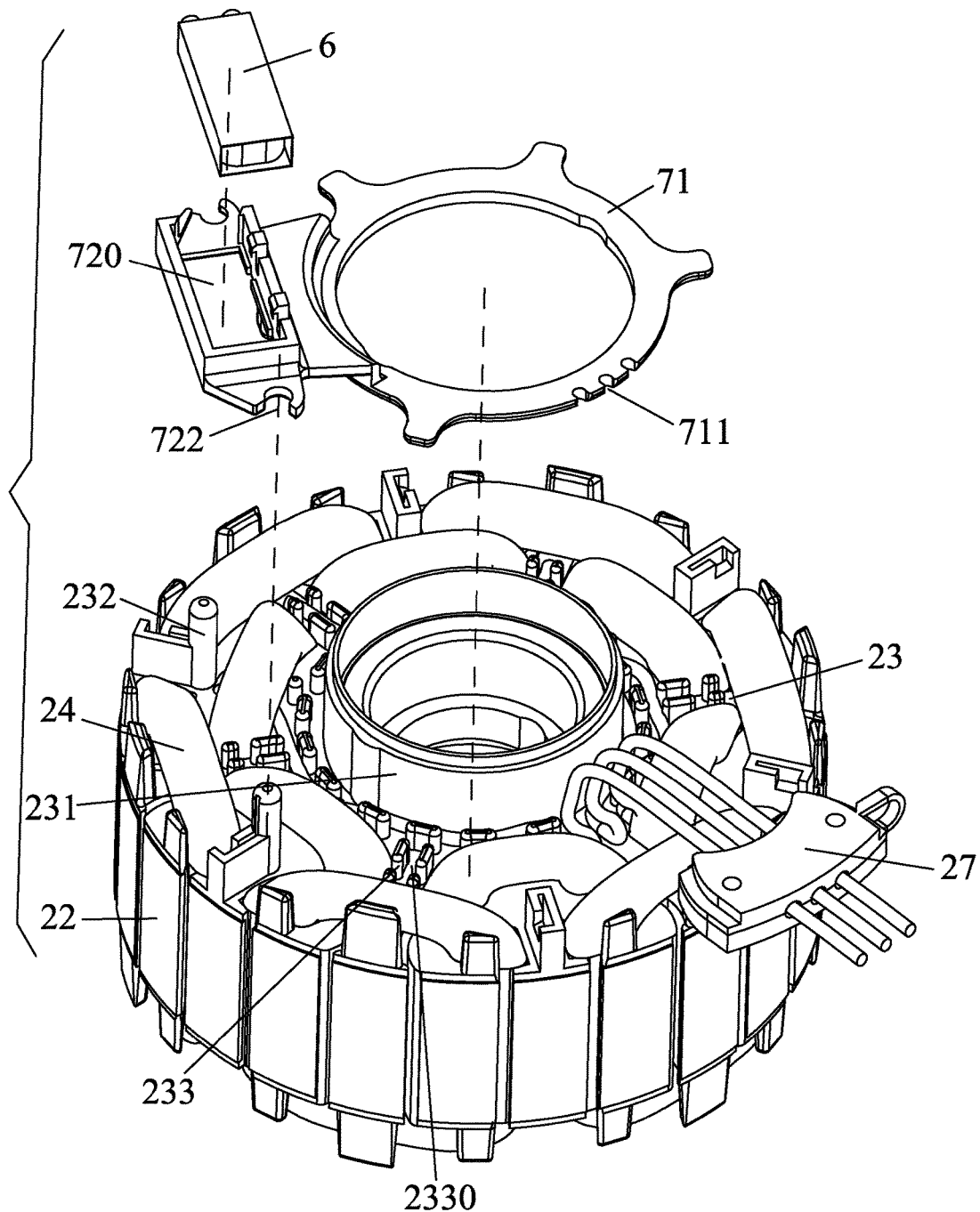
FIG. 9 is an exploded view of a plastic-packaged stator when a plastic-packaged body is not yet installed in Example 3.
Figure 10:
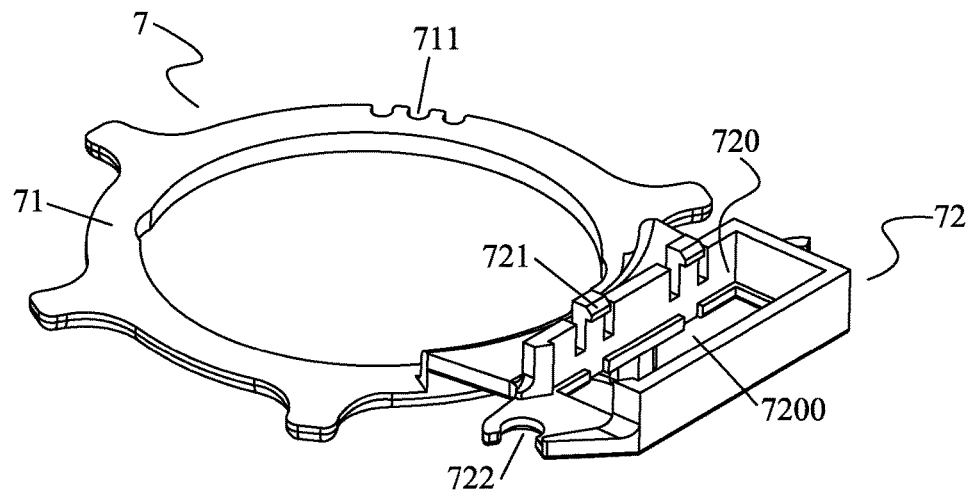
FIG. 10 is a stereogram of a fixing frame in Example 3.
Figure 11:
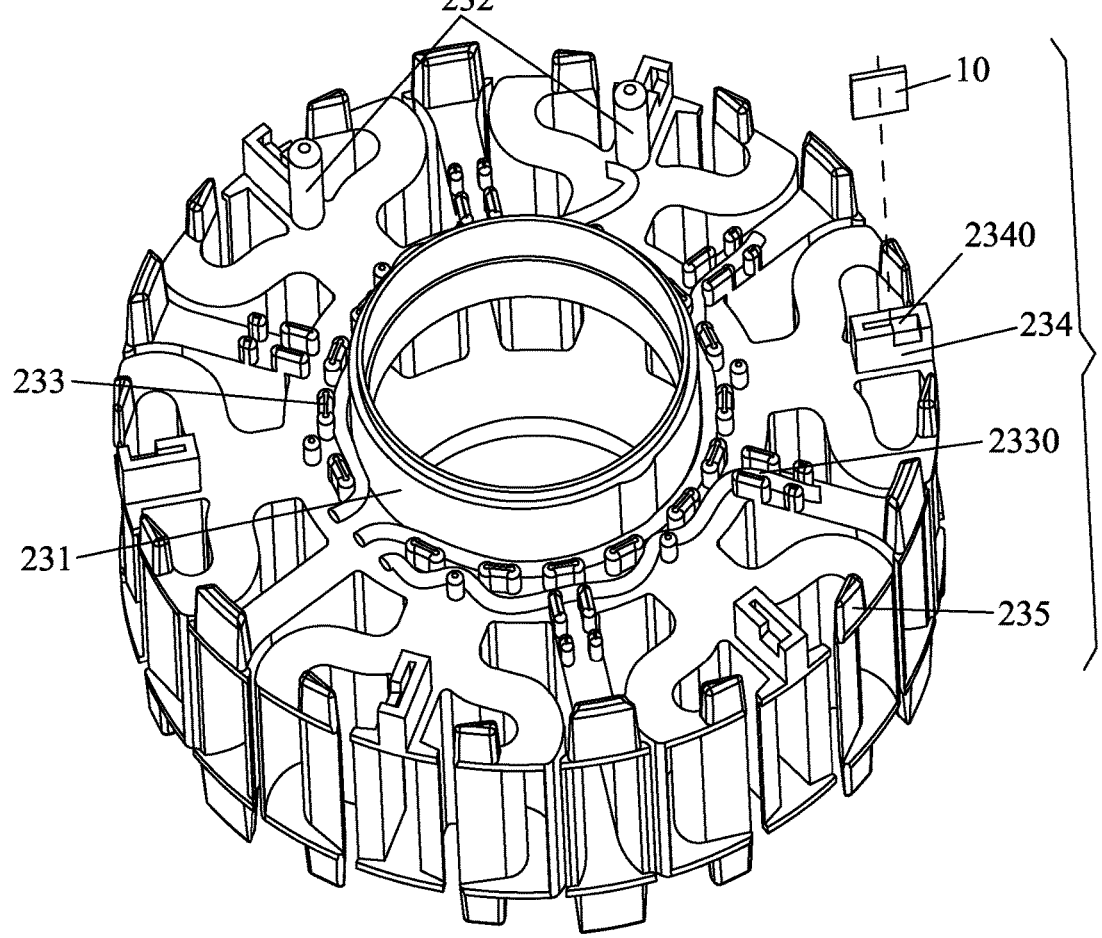
FIG. 11 is a stereogram of an insulator terminal in Example 3.
Figure 12:
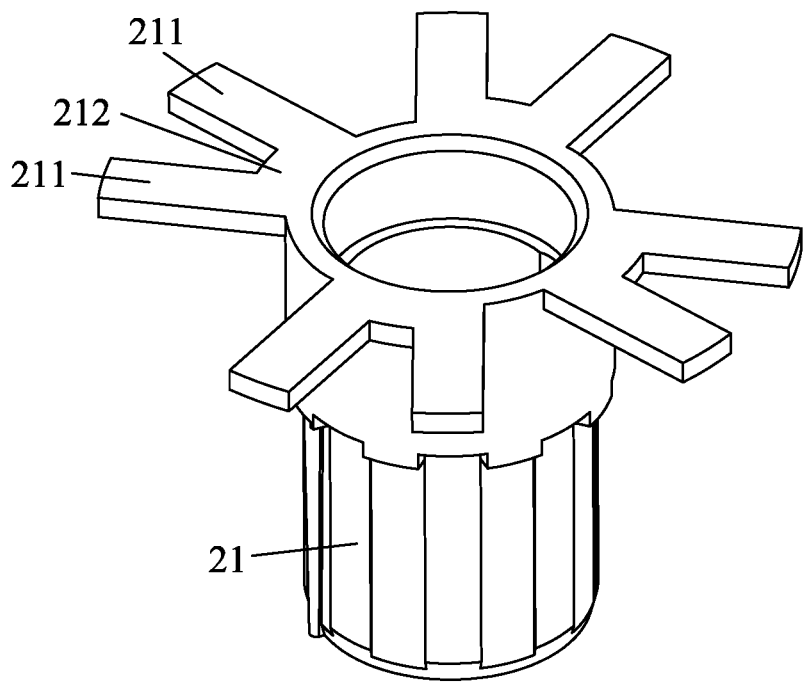
FIG. 12 is a stereogram of a sleeve base taken from a first angle in Example 4.
Figure 13:
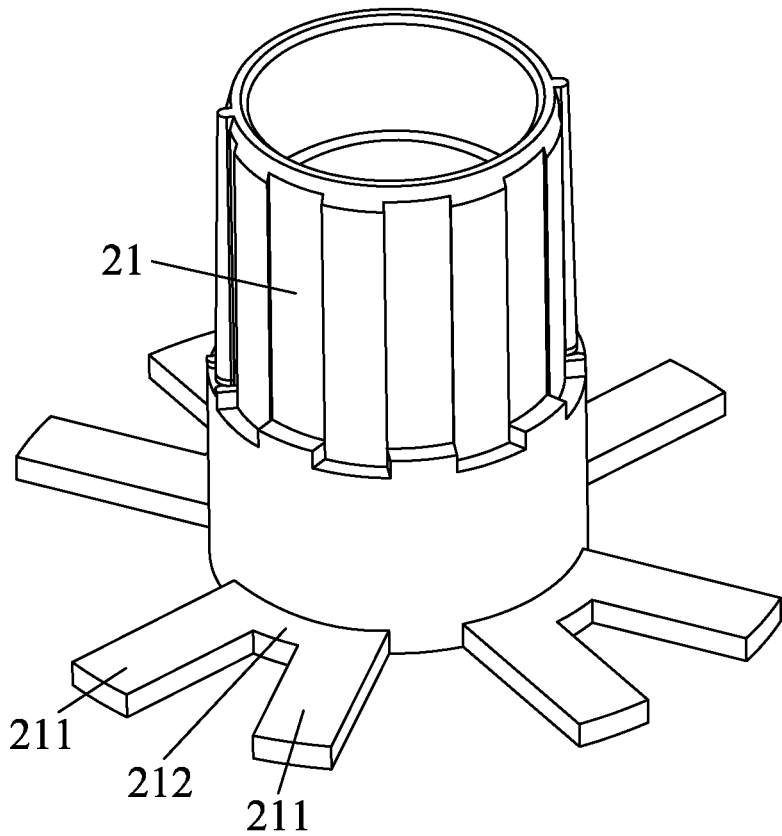
FIG. 13 is a stereogram of a sleeve base taken from a second angle in Example 4.
Figure 14:
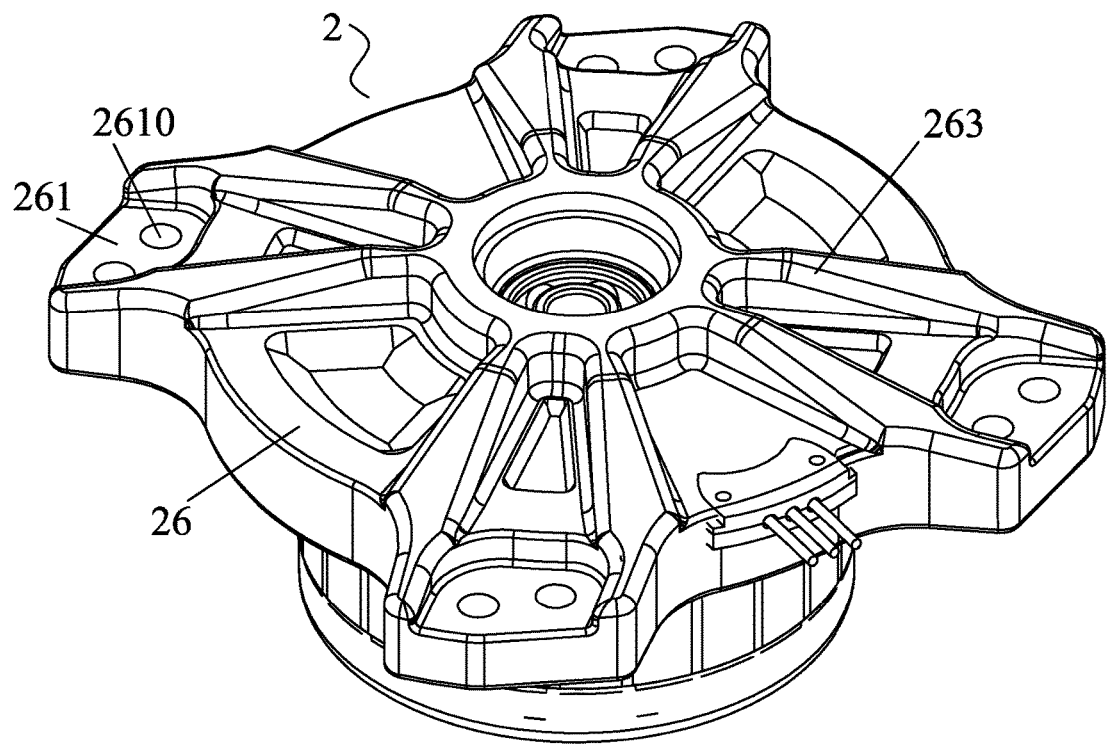
FIG. 14 is a stereogram of a plastic-packaged stator in Example 4.
Figure 15:
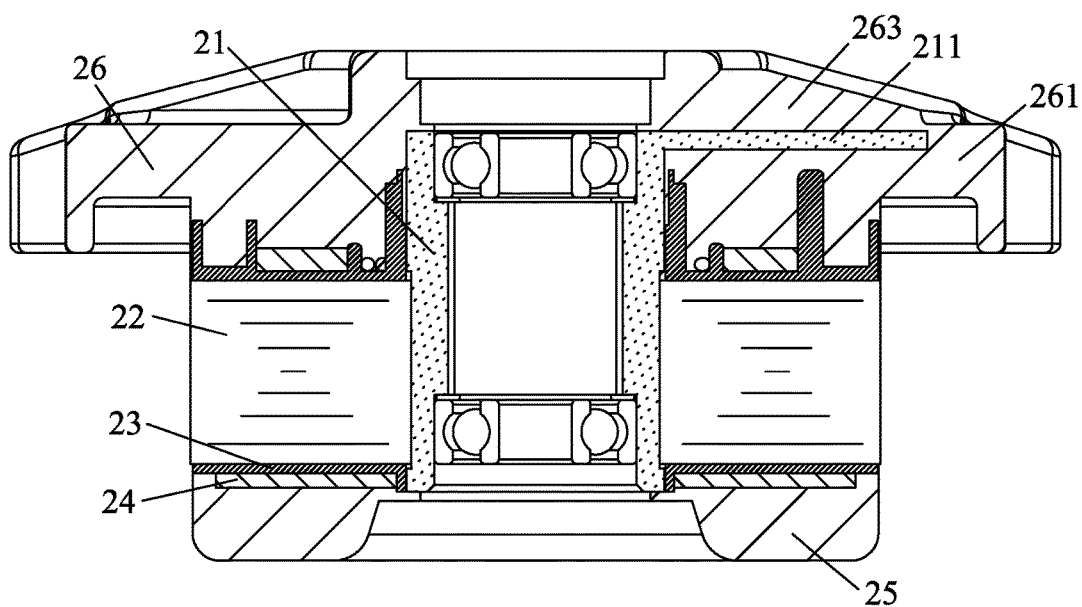
FIG. 15 is a schematic diagram of a plastic-packaged stator in Example 4.
Figure 16:
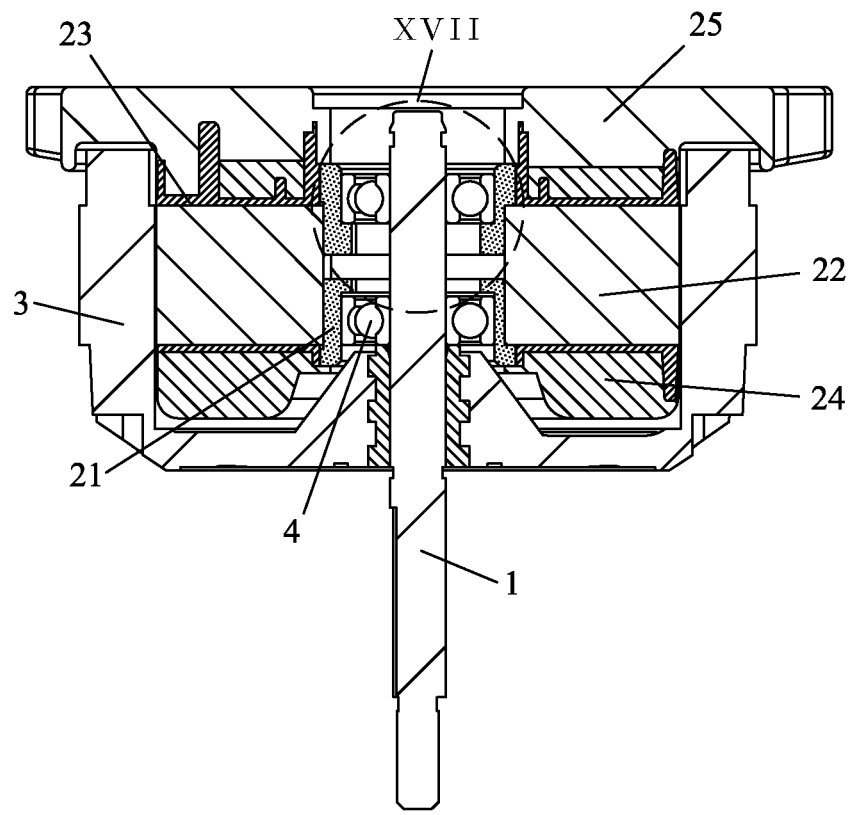
FIG. 16 is a schematic diagram of a plastic-packaged motor in Example 5.
Figure 17:
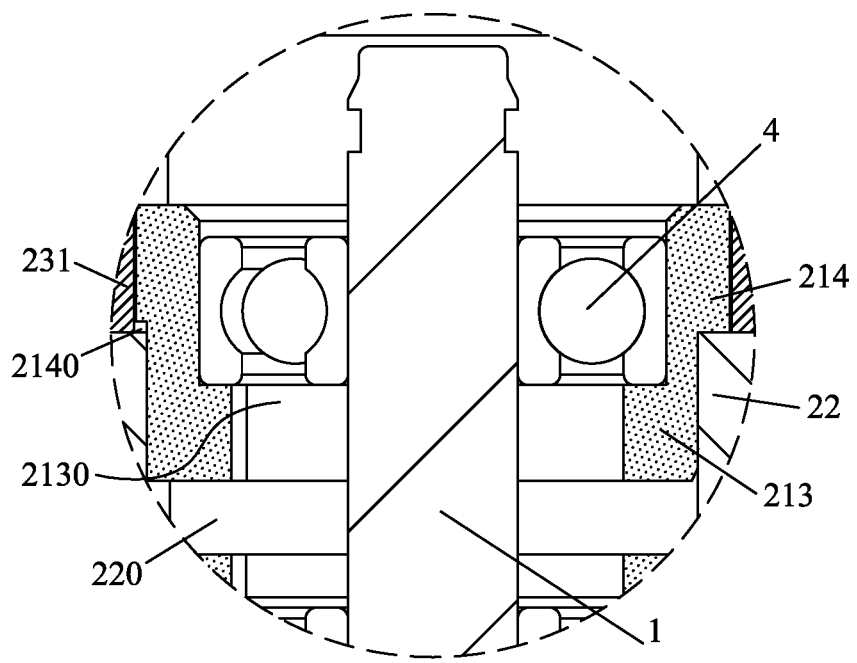
FIG. 17 is a partial enlargement view taken from part XVII in FIG. 16.
Figure 18:
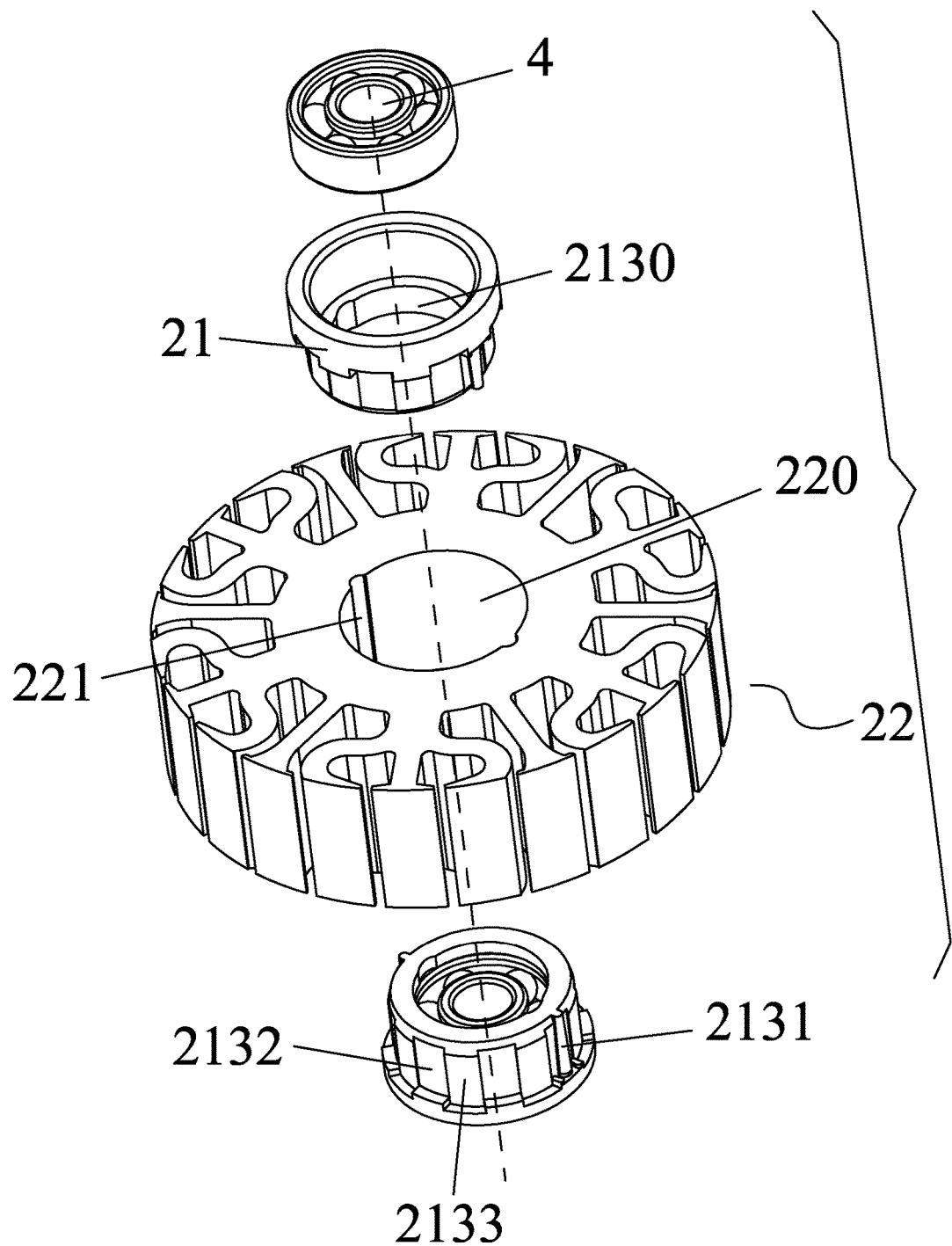
FIG. 18 is a diagram showing an assembly of a sleeve base and a stator core in Example 5.
Figure 19:
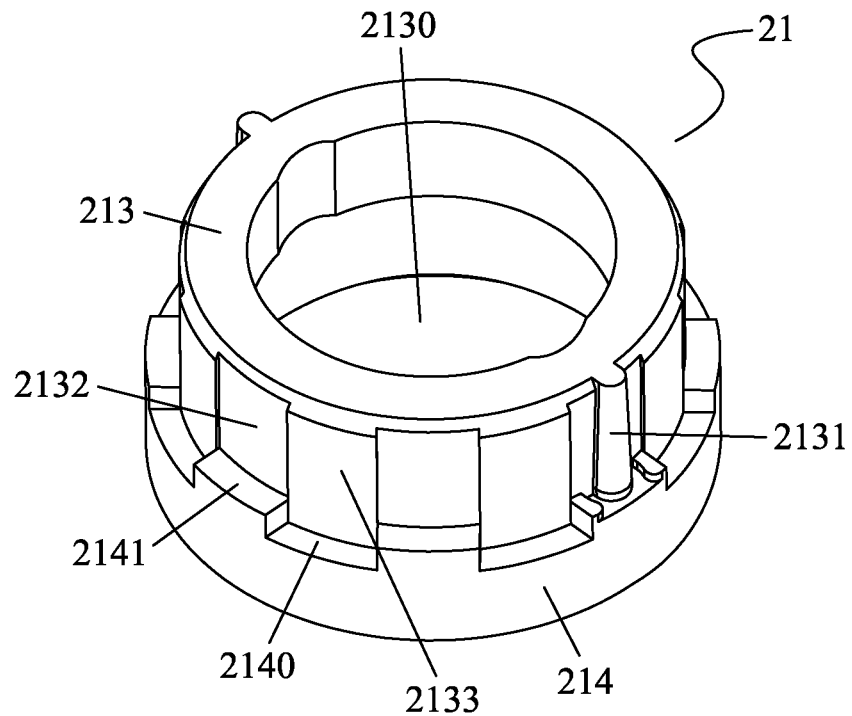
FIG. 19 is a stereogram of a sleeve base in Example 5.

As shown in FIG. 7, the coil windings 24 comprises primary coil windings 241 and secondary coil windings 242. The primary coil windings 241 are divided into several groups. Each group of the primary coil windings 241 is coiled on two adjacent first windings slots 501 of two adjacent second tooth portions 52. The secondary coil windings 242 are divided into several groups. Each group of the secondary coil windings 242 is coiled on two second winding slots 502 on two sides of the tooth root 521.

Example 3

As shown in FIGS. 8-11, the plastic-packaged stator 2 further comprises a thermostat 6 and a fixing frame 7. The fixing frame 7 comprises an annular portion 71 and a clamping portion 72. The clamping portion bulges outwards from the annular portion 71. A cylindrical body 231 is disposed in a middle of the terminal insulator 23. The annular portion 71 is sleeved on the cylindrical body 231, and the clamping portion 72 is disposed on the coil windings 24. The thermostat 6 is disposed on the clamping portion 72 and is in the vicinity of the coil windings 24. The clamping portion 72 is provided with mounting slots 720. The thermostat 6 is mounted in the mounting slot 720. A bottom of the mounting slot 720 is a through hole 7200, and the thermostat 6 is in the vicinity of the coil windings 24. The clamping portion 72 is provided with a fixing block 721. The fixing block 721 is configured to fix the thermostat 6 in the mounting slot 720. Two sides of the clamping portion 72 are provided with slots 722, and a top surface of the terminal insulator 23 is provided with cylinders 232. The cylinders 232 are secured to the slots 722.

A plurality of positioning blocks 233 is disposed on the top surface of the terminal insulator 23. Fixing grooves 2330 form between two positioning blocks 233, and the fixing grooves are configured to fix enameled wires. Part of the positioning blocks 233 are circumferentially arranged along a periphery of the cylindrical body 231, and the annular portion 71 is configured to fix the enameled wires in the vicinity of the cylindrical body 231 in the fixing groove 2330. A plurality of terminal posts 234 is disposed on an outer edge of the top surface of the terminal insulator 23. Terminals 10 are disposed in terminal slots 2340 on the terminal posts 234. A plurality of bumps 235 is disposed on the outer edge of the top surface of the terminal insulator 23, and the bumps 235 are configured to limit the coil windings 24 within a range of the stator core 22. The plastic-packaged body 25 is provided with a wire clamp 27. A leading-out wire of the plastic-packaged stator 2 is lead out from the wire clamp 27. The annular portion 71 is provided with a plurality of positioning slots 711 on the outer edge. The leading-out wire of the plastic-packaged stator 2 is fixed on the positioning slots 711, and is lead out from the wire clamp 27.

Example 4

As shown in FIGS. 12-15, one end of an outer side of the sleeve base 21 which is in the vicinity of the plastic-packaged end plate 26 is provided with a plurality of second reinforcing ribs 211 in a radial direction. The plastic-packaged body 25 is sleeved on the second reinforcing ribs 211. Two adjacent second reinforcing ribs 211 form a pair of second reinforcing ribs, and the pair of second reinforcing ribs 211 are V-shaped. A connecting member 212 is disposed between the two adjacent second reinforcing ribs 211 and on one end of the sleeve base 21. The connecting member 212 is configured to connect the two adjacent second reinforcing ribs 211. The second reinforcing ribs 211 protrudes out from an outer side surface of the stator core 22 along the radial direction.

Mounting feet 261 are disposed on the plastic-packaged end plate 26 and on an outer side of each pair of second reinforcing ribs 211. The mounting feet 261 comprise mounting holes 2610. Above each second reinforcing rib 211, the first reinforcing rib 263 is disposed on a top surface of the plastic-packaged end plate 26. The outer side of the sleeve base 21 is provided with four pairs of the second reinforcing ribs 211, and the four pairs of the second reinforcing ribs 211 are circumferentially arranged at intervals. The pair number of the second reinforcing ribs 211 is decided according to actual needs, for example, three pairs or five pairs of the second reinforcing ribs are optional. In the example, the pair number of the second reinforcing ribs 211 is not intended to limit the invention. The second reinforcing ribs 211 are bended from an end surface of the sleeve base 21. The sleeve base 21 is cast from aluminum. The aluminum features favorable heat-conducting property and structural strength, thus the heat generated by the bearing during high-speed rotation is dissipated, and the bonding strength between the sleeve base and the plastic-packaged body is ensured. The risk of the plastic-packaged body detaching from the sleeve base is lowered, and the plastic-packaged stator is more reliable.

Example 5

As shown in FIGS. 16-19, the stator core 22 is provided with an axle hole 220. The sleeve base 21 is metal material. The sleeve base 21 is disposed in the axle hole 220 and matches with an inner wall of the axle hole 220. The bearing 4 is disposed in the sleeve base 21. The rotary shaft 1 is disposed in the sleeve base 21, and is supported by the bearing 4. One end of the rotary shaft 1 protrudes out from the sleeve base 21 and is connected to the external rotor 3, and at least part of the bearing 4 is inserted in the axle hole 220 of the stator core 22. The sleeve base 21 comprises a first sleeve base and a second sleeve base. The first sleeve base and the second sleeve base are disposed at two ends of the axle hole 220. The first sleeve base and the second sleeve base each are provided with the bearing 4, and at least part of the bearing 4 is inserted in the axle hole 220 of the stator core 22. The first sleeve base and the second sleeve base both comprise a sleeve portion 213 and a flanging portion 214. One end of the flanging portion protrudes outwards from the sleeve portion 213. The bearing housing 2130 configured to mount the bearing 4 is disposed in the sleeve portion 213. The sleeve portion 213 is disposed in the axle hole 220, and part of the plastic-packaged body 25 is configured to fix the flanging portion 214 on an end surface of the stator core 22. An inner wall of the axle hole 220 is provided with a plurality of positioning grooves 221 in the axial direction, and an outer wall of the sleeve portion 213 is provided with a plurality of positioning bars 2131 which matches with the positioning grooves 221. The outer wall of the sleeve portion 213 is provided with a plurality of first grooves 2132 and first bulges 2133. The first grooves and the first bulges are circumferentially arranged at intervals. The flanging portion 214 is provided with a plurality of first lug bosses 2141 which are circumferentially arranged at intervals. A gap 2140 forms between every two adjacent first lug bosses 2141. Each first groove 2132 on the outer wall of the sleeve portion 213 is corresponding to one first lug boss 2141 on the flanging portion 214. Each first bulge 2133 on the outer wall of the sleeve portion 213 is corresponding to one gap 2140 on the flanging portion 214. The cylindrical body 231 is disposed on the terminal insulator 23, the cylindrical body 231 is configured to plug the gap 2140 and forms a sealed space. When the sleeve portion 213 is disposed in the axle hole 220, because the outer wall of the sleeve portion 213 tightly matches with the inner wall of the axle hole 220, the aluminum scraps produced by the outer wall of the sleeve portion 213 are sealed in the sealed space, and preventing the aluminum scraps from falling to other places of the external rotor motor and adversely affecting the performance or quality of the external rotor motor.

Or, the sleeve base 21 comprises a sleeve portion 213 and a flanging portion 214. One end of the flanging portion protrudes outwards from the sleeve portion 213. The sleeve portion 213 is disposed in the axle hole 220, and part of the plastic-packaged body 25 is configured to fix the flanging portion 214 on an end surface of the stator core 22. Two ends of the sleeve portion 213 each are provided with the bearing housing 2130 which is configured to mount the bearing 4, and at least part of the bearing 4 is inserted in the axle hole 220 of the stator core 22.

Example 6

Figure 20:
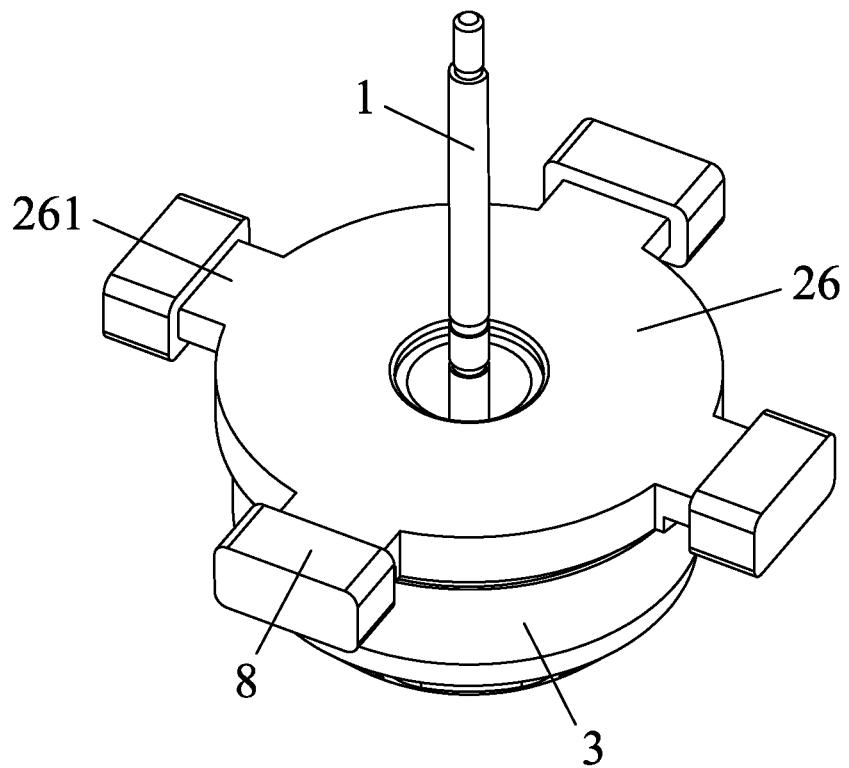
FIG. 20 is a stereogram of an external rotor motor in Example 6.

As shown in FIG. 20, the rotary shaft 1 is disposed in the sleeve base 21, and two ends of the rotary shaft are supported by the bearings 4. Two ends of the rotary shaft 1 protrude outwards from the sleeve base 21. One end of the rotary shaft is inserted in the chamber 30 and is connected to the external rotor 3, and the other end protrudes outwards from a center hole of the plastic-packaged end plate 26 to form a shaft extension. The shaft extension is connected to a load. A mounting portion is disposed at an outer edge of the plastic-packaged end plate 26, and the mounting portion is configured to mount a buffer ring 8. The mounting portion comprises four mounting feet 261, and the mounting feet are circumferentially arranged at intervals.

Example 7

Figure 21:
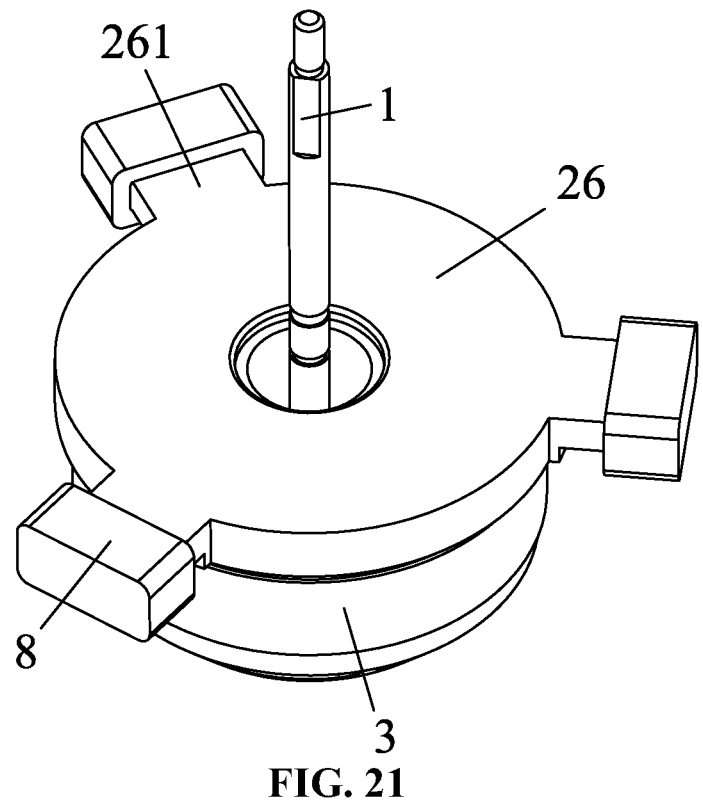
FIG. 21 is a stereogram of an external rotor motor in Example 7.

As shown in FIG. 21, the example follows a basic structure of Example 6, except that the mounting portion comprises three mounting feet 261, and the mounting feet are circumferentially arranged at intervals.

Example 8

Figure 22:
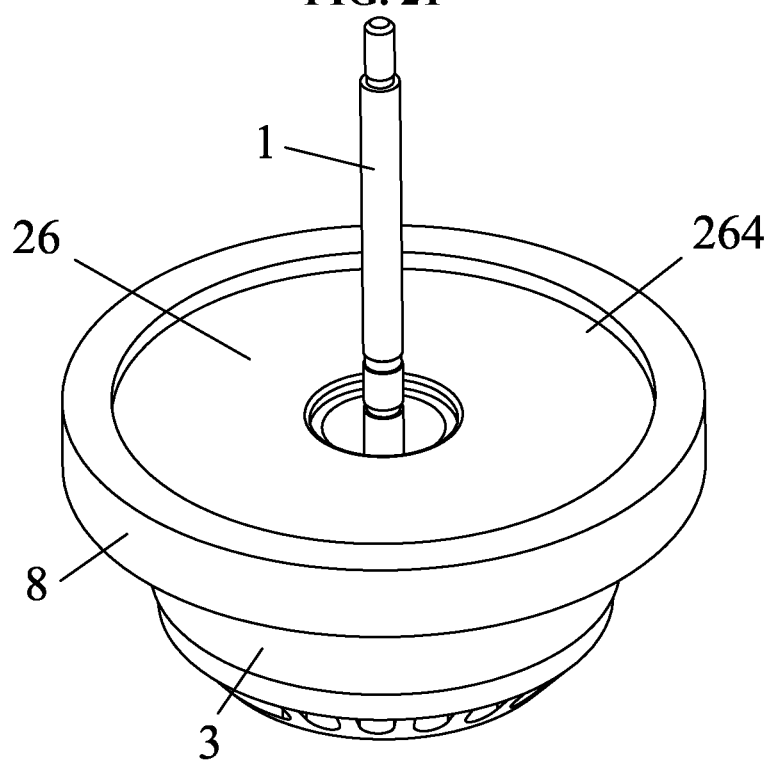
FIG. 22 is a stereogram of an external rotor motor in Example 8.

As shown in FIG. 22, the example follows a basic structure of Example 6, except that the mounting portion is a circular flange 264.

Example 9

Figure 23:
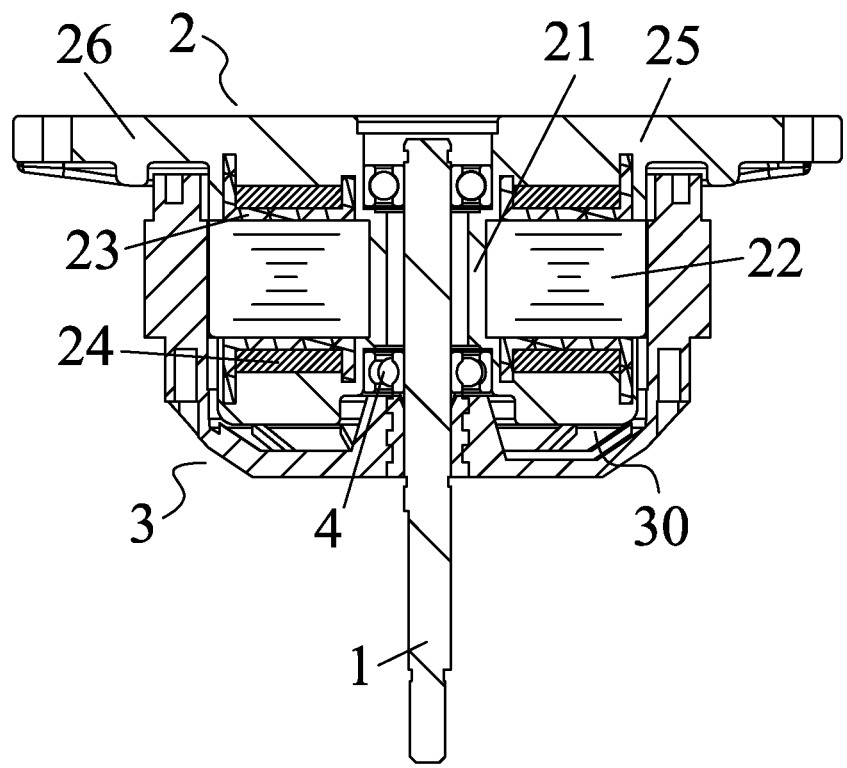
FIG. 23 is a schematic diagram of an external rotor motor in Example 9.
Figure 24:
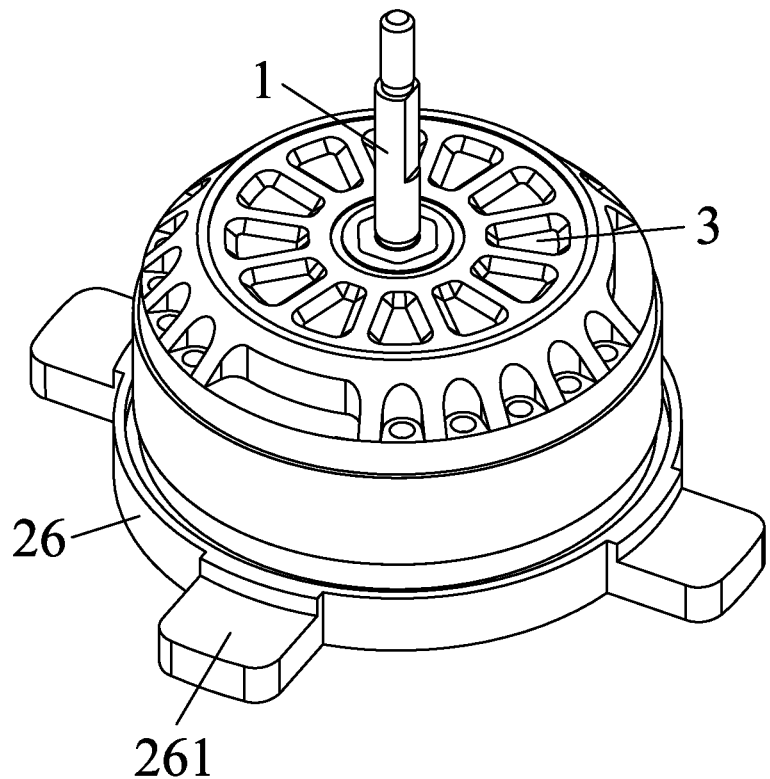
FIG. 24 is a stereogram of an external rotor motor in Example 9.

As shown in FIGS. 23-24, the example follows a basic structure of Example 6, except that one end of the rotary shaft 1 protrudes outside from the sleeve base 21 and is connected to the external rotor 3, then the rotary shaft protrudes outwards from the external rotor 3 to form a shaft extension. The shaft extension is connected to a load. The mounting portion comprises four mounting feet 261, and the mounting feet are circumferentially arranged at intervals.

Example 10

Figure 25:
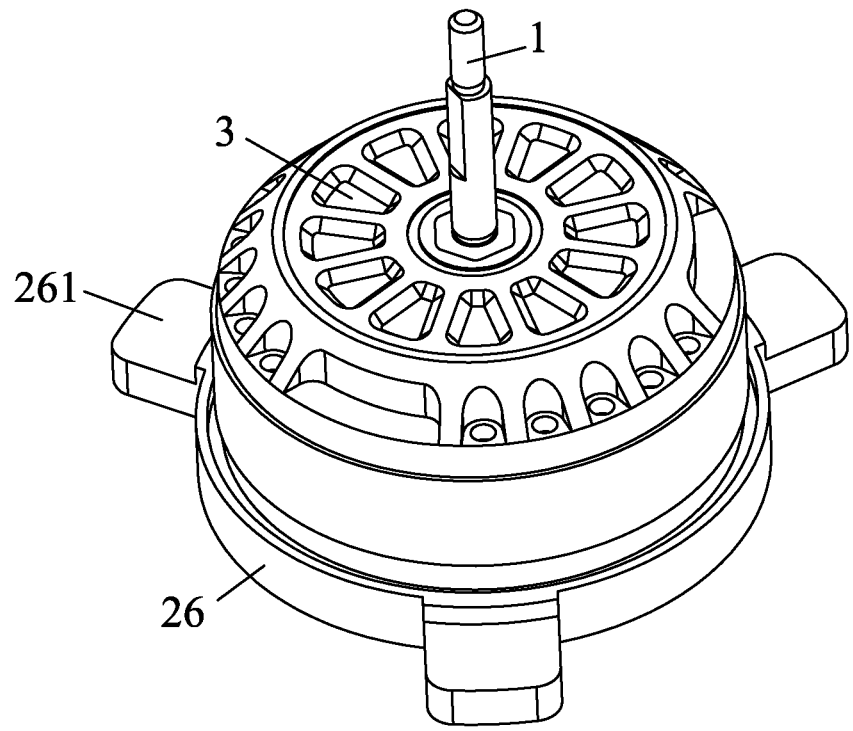
FIG. 25 is a stereogram of an external rotor motor in Example 10.

As shown in FIG. 25, the example follows a basic structure of Example 9, except that the mounting portion comprises three mounting feet 261, and the mounting feet are circumferentially arranged at intervals.

Example 11

Figure 26:
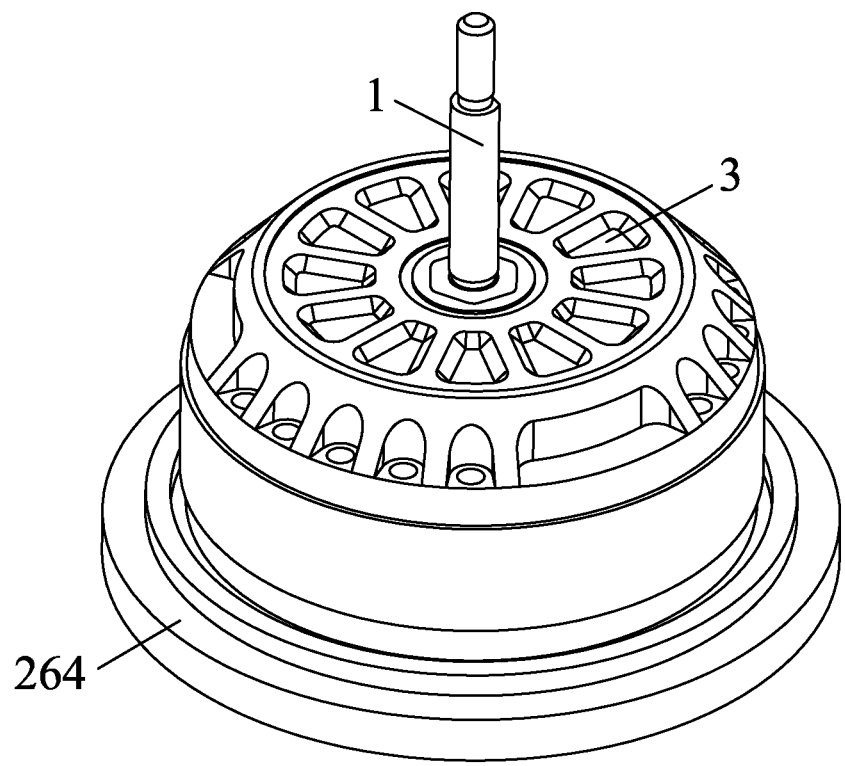
FIG. 26 is a stereogram of an external rotor motor in Example 11.

As shown in FIG. 26, the example follows a basic structure of Example 9, except that the mounting portion is a circular flange 264.

Example 12

Figure 27:
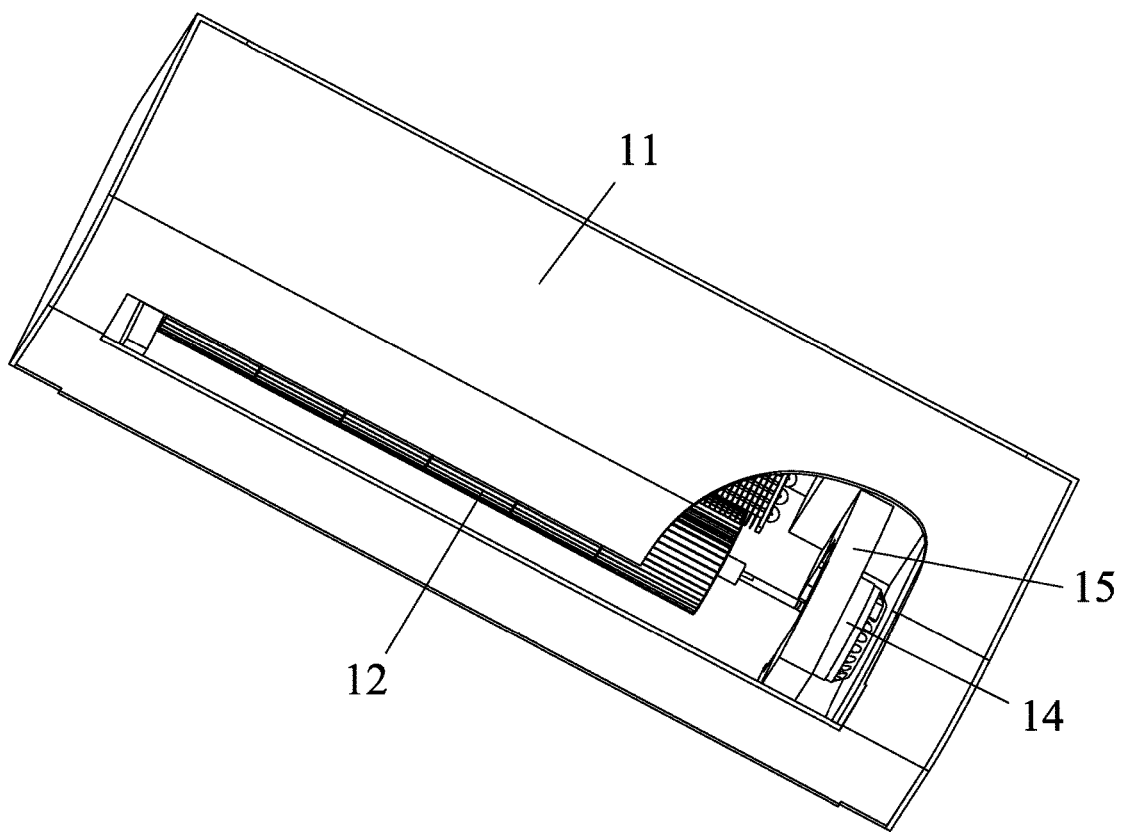
FIG. 27 is a stereogram of an outdoor unit of an air conditioner in Example 12.
Figure 28:
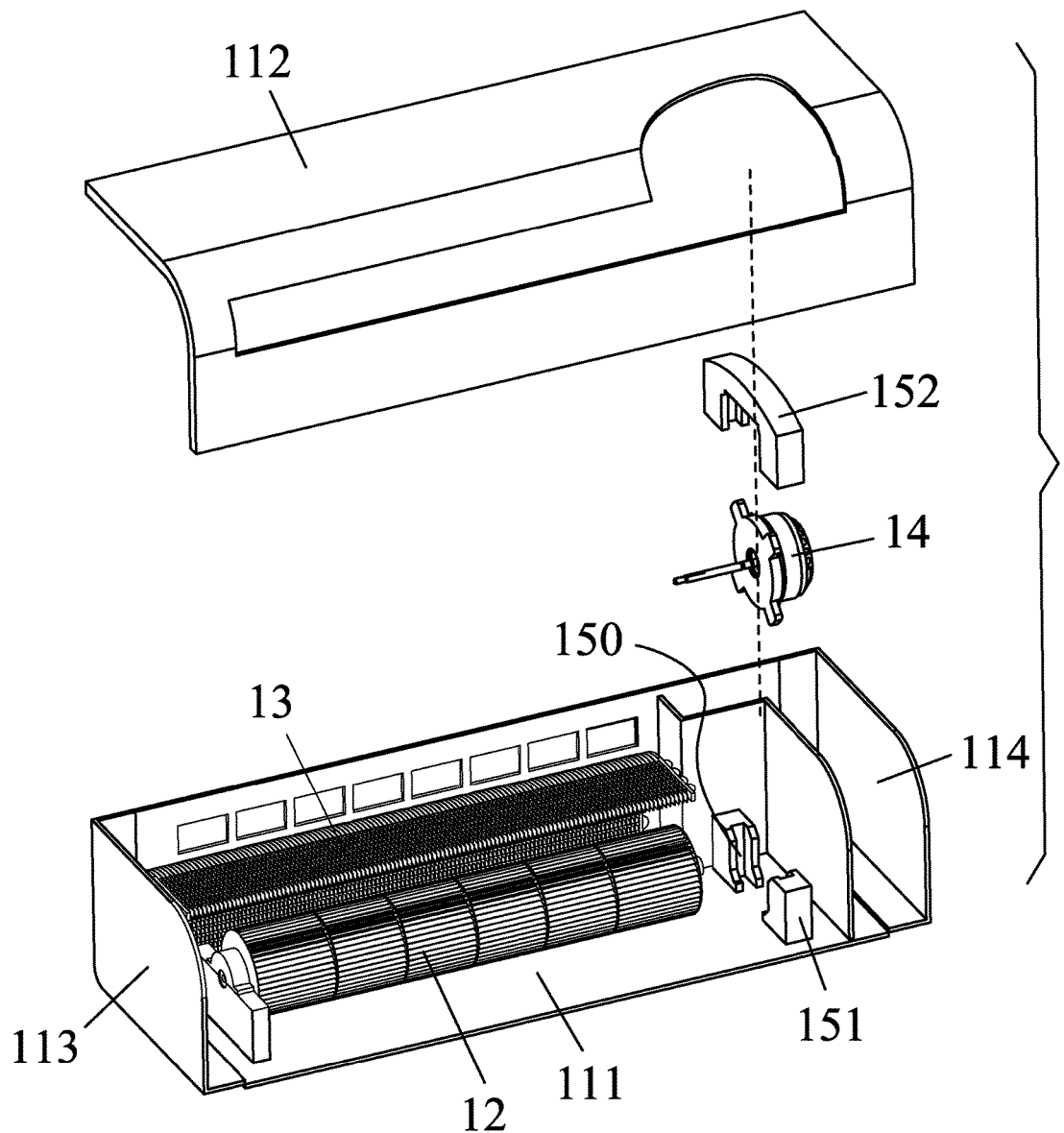
FIG. 28 is an exploded view of an outdoor unit of an air conditioner in Example 12.

As shown in FIGS. 27-28, an indoor unit of air conditioner comprises an air conditioner box 11, a wind wheel 12, a cooling fin 13, and an external rotor motor 14. The wind wheel, the cooling fin, and the external rotor motor are disposed in the air conditioner box 11. A shaft extension of the external rotor motor 14 is connected to the wind wheel 12. The air conditioner box 11 is provided with an installing support 15. The installing support 15 is provided with an installing slot 150. The mounting portion of the external rotor motor 14 is installed in the installing slot 150 via the buffer ring 8. The air conditioner box 11 comprises a lower cover plate 111, an upper cover plate 112, a first side plate 113, and a second side plate 114. The installing support 15 comprises a first installing support 151 disposed on the lower cover plate 111 and a second installing support 152 disposed on the first installing frame 151. The installing slot 150 forms between the first installing support 151 and the second installing support 152.

Example 13

Figure 29:
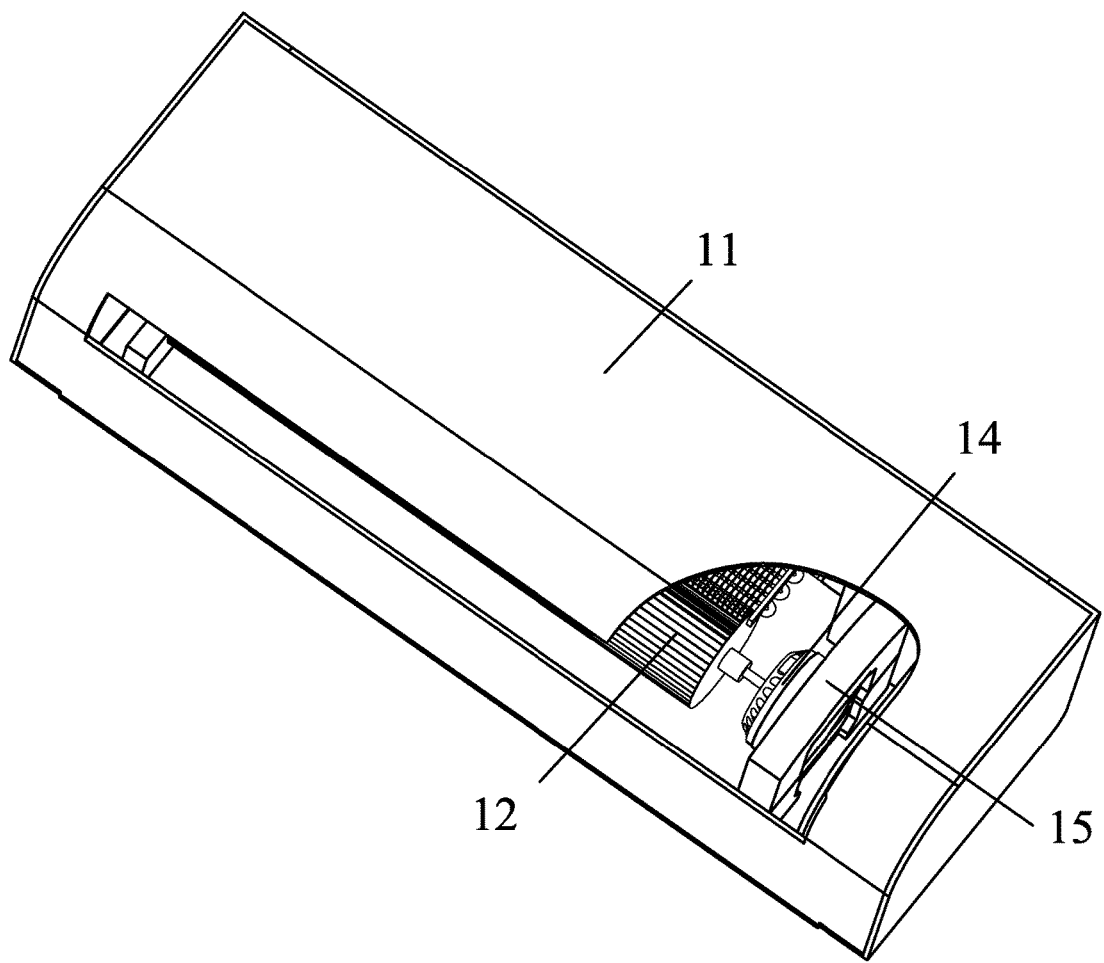
FIG. 29 is a stereogram of an outdoor unit of an air conditioner in Example 13.
Figure 30:
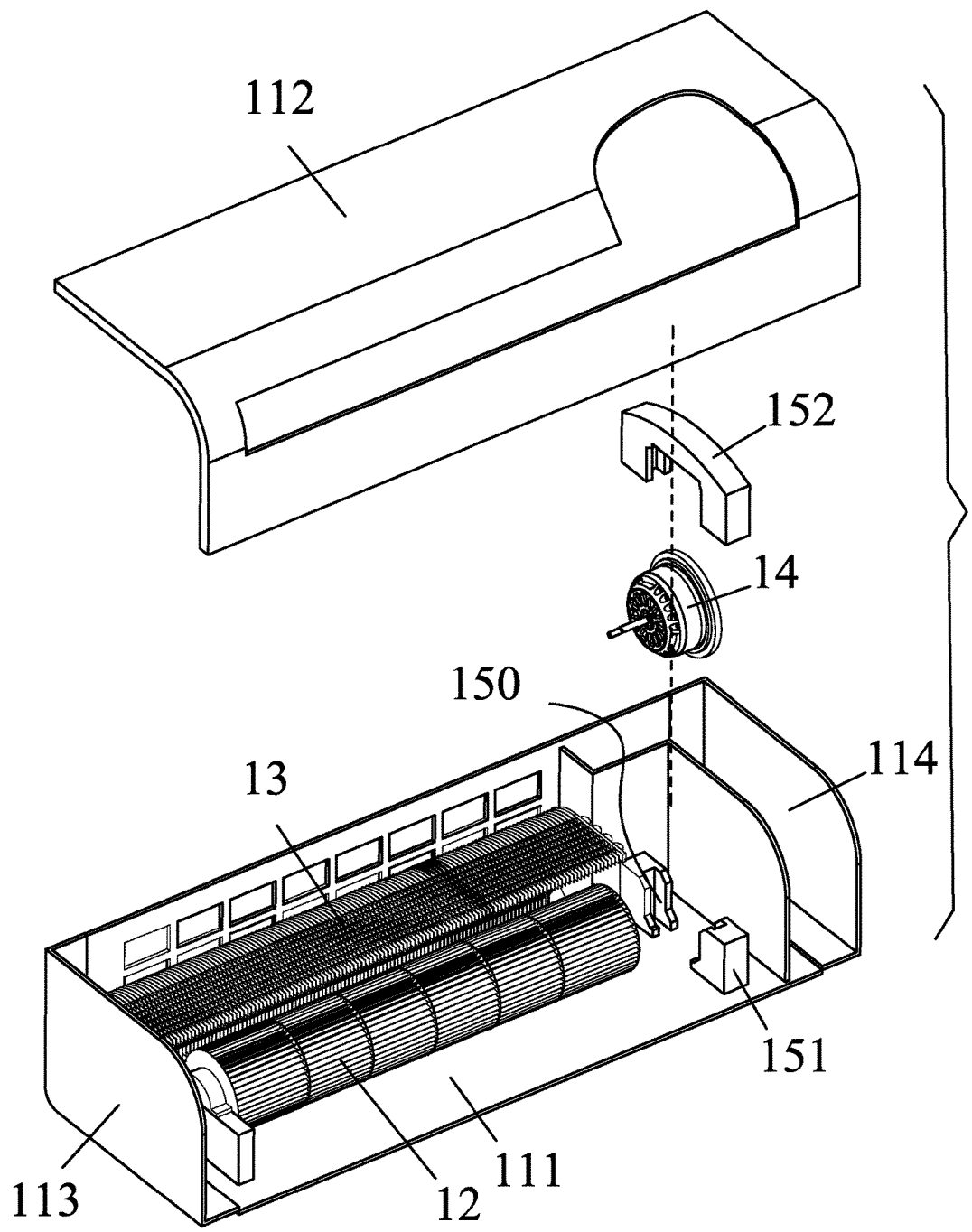
FIG. 30 is an exploded view of an outdoor unit of an air conditioner in Example 13.

As shown in FIGS. 29-30, an indoor unit of the air conditioner comprising the external rotor motor in Example 9, comprises an air conditioner box 11, a wind wheel 12, a cooling fin 13, and an external rotor motor 14. The wind wheel, the cooling fin, and the external rotor motor are disposed in the air conditioner box 11. A shaft extension of the external rotor motor 14 is connected to the wind wheel 12. The air conditioner box 11 is provided with an installing support 15. The installing support 15 is provided with an installing slot 150. The mounting portion of the external rotor motor 14 is installed in the installing slot 150 via the buffer ring 8. The air conditioner box 11 comprises a lower cover plate 111, an upper cover plate 112, a first side plate 113, and a second side plate 114. The installing support 15 comprises a first installing support 151 disposed on the lower cover plate 111 and a second installing support 152 disposed on the first installing frame 151. The installing slot 150 forms between the first installing support 151 and the second installing support 152.

Example 14

Figure 31:
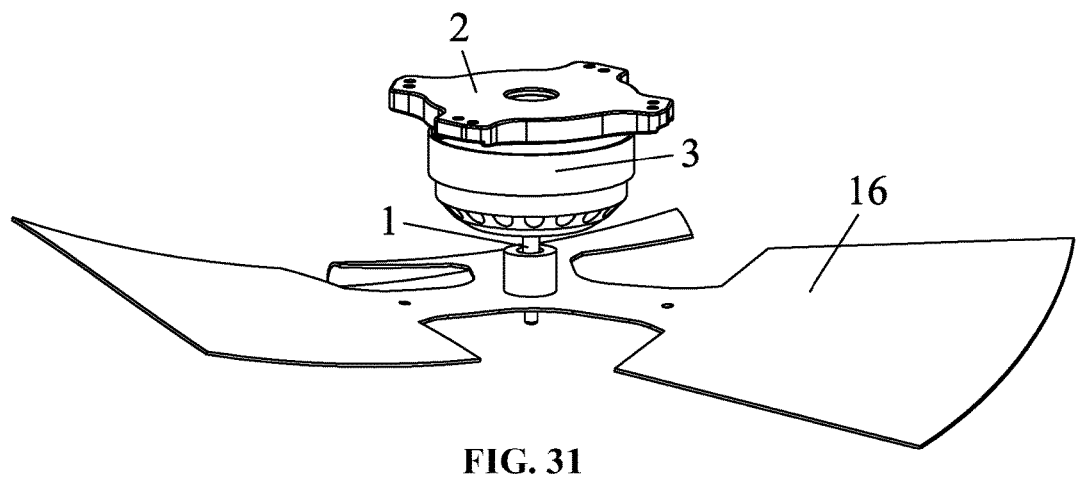
FIG. 31 is a stereogram of an external rotor motor in Example 14.
Figure 32:
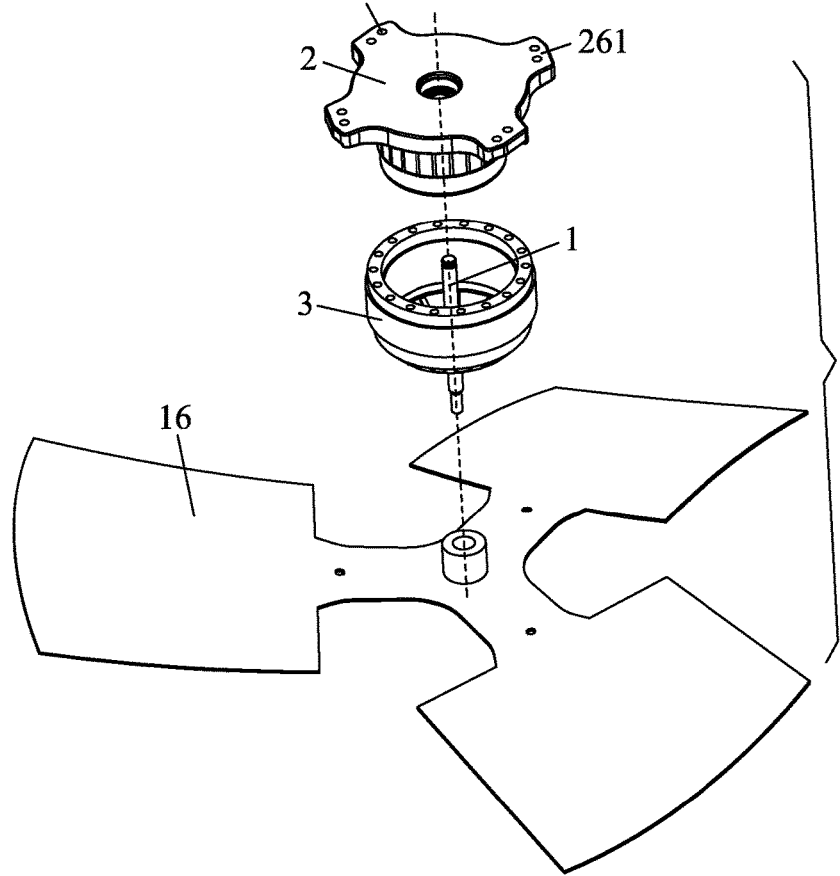
FIG. 32 is an exploded view of an external rotor motor in Example 14.
Figure 33:
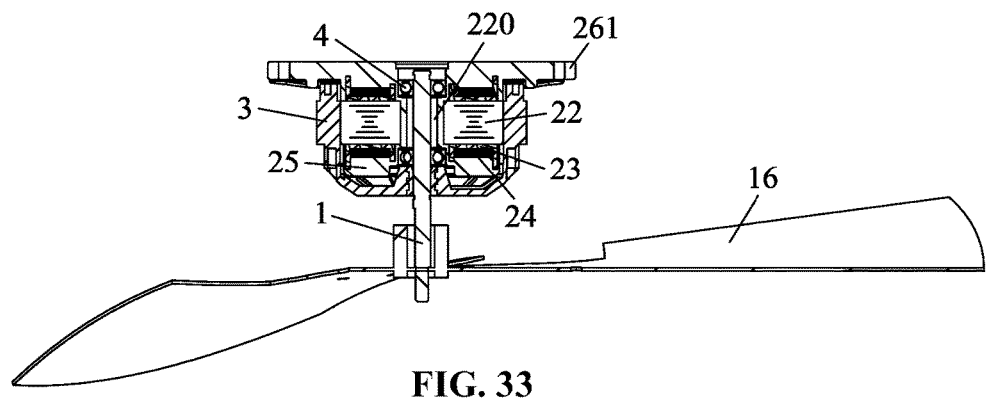
FIG. 33 is a schematic diagram of an external rotor motor in Example 14.

As shown in FIGS. 31-33, an external rotor motor comprises a rotary shaft 1. The rotary shaft is disposed in the axle hole 220 of the stator core 22, and two ends of the rotary shaft are supported by the bearings 4. One end of the rotary shaft 1 protrudes outwards from the axle hole 220 and is connected to the external rotor 3. The rotary shaft further protrudes outwards from the external rotor 3, to form a shaft extension. The fan blades 16 are mounted on the shaft extension of the rotary shaft 1. A plurality of mounting feet 261 is disposed on an outer edge of the plastic-packaged end plate 26, and the mounting feet 261 comprise mounting holes 2610. The terminal insulator 23 is mounted on an end surface of the stator core 22 via injection molding.

Example 15

Figure 34:
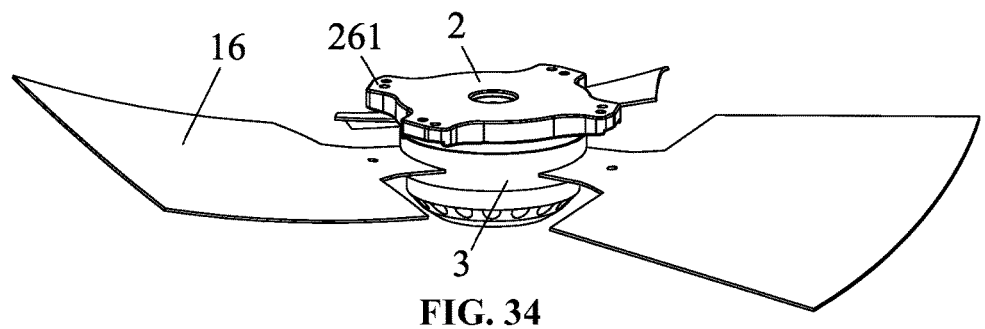
FIG. 34 is a stereogram of an external rotor motor in Example 15.
Figure 35:
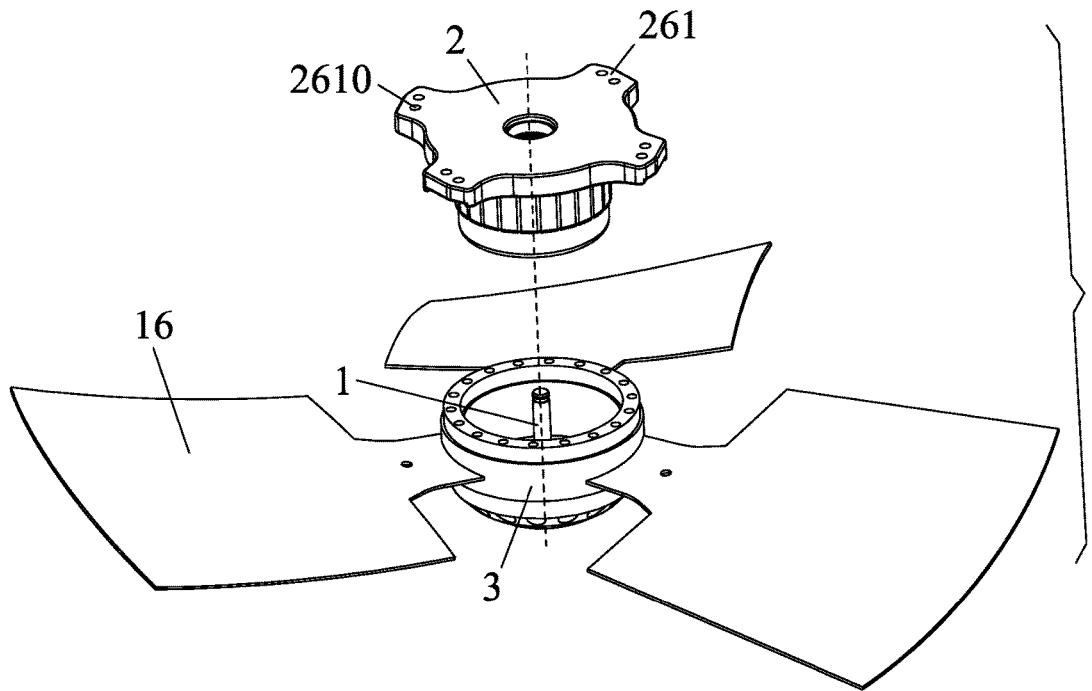
FIG. 35 is an exploded view of an external rotor motor in Example 15.
Figure 36:
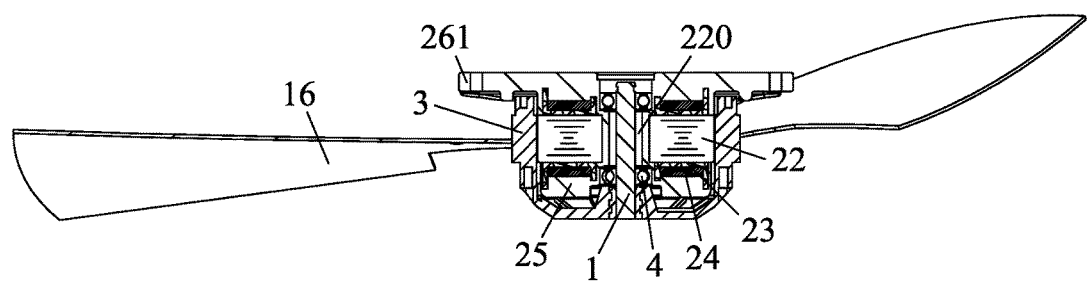
FIG. 36 is a schematic diagram of an external rotor motor in Example 15.

As shown in FIGS. 34-36, an external rotor motor comprises a rotary shaft 1. The rotary shaft is disposed in the axle hole 220 of the stator core 22, and two ends of the rotary shaft are supported by the bearings 4. One end of the rotary shaft 1 protrudes outwards from the axle hole 220 and is connected to the external rotor 3. The fan blades 16 are soldered on an outer wall surface of the external rotor 3. A plurality of mounting feet 261 is disposed on an outer edge of the plastic-packaged end plate 26, and the mounting feet 261 comprise mounting holes 2610. The terminal insulator 23 is mounted on an end surface of the stator core 22 via injection molding.

Example 16

Figure 37:
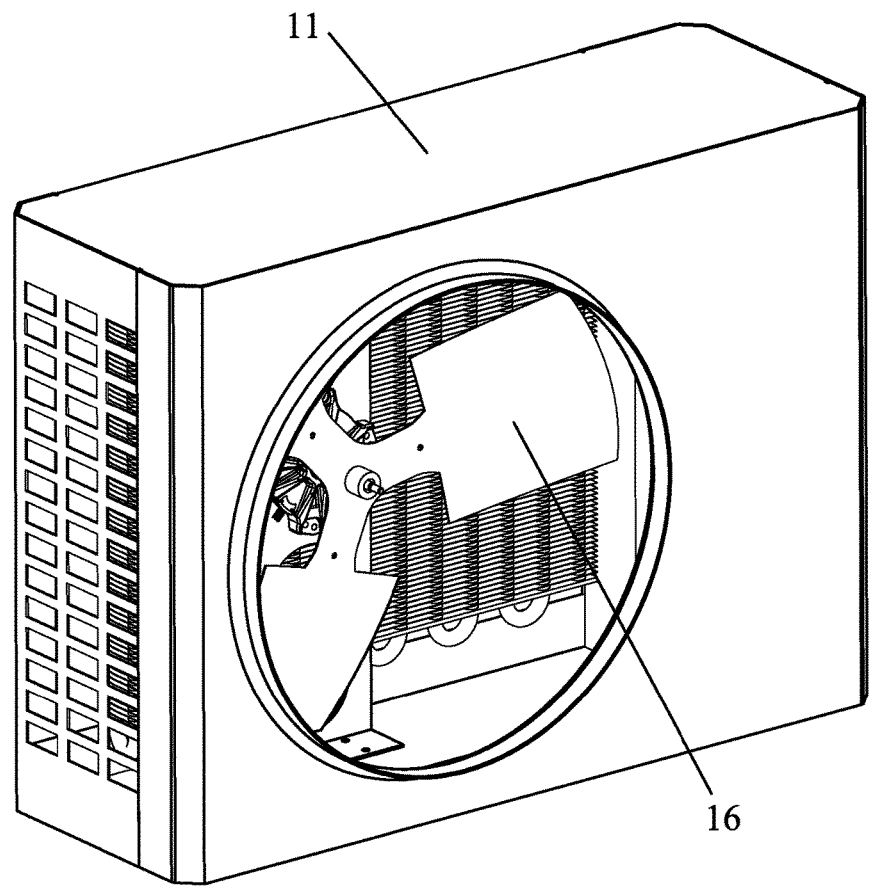
FIG. 37 is a stereogram of an outdoor unit of an air conditioner in Example 16.
Figure 38:
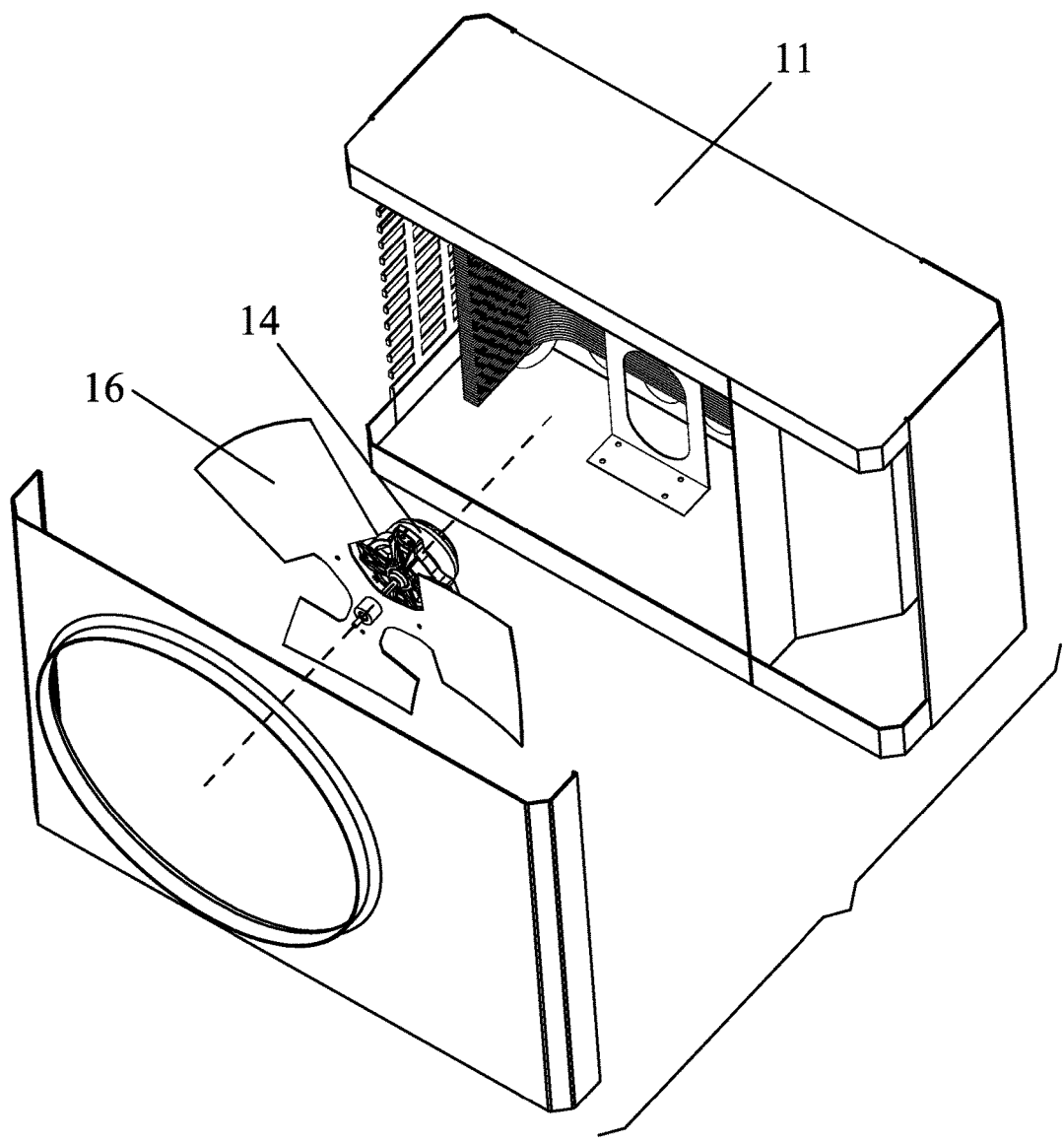
FIG. 38 is an exploded view of an outdoor unit of an air conditioner in Example 16.

As shown in FIGS. 37-38, an outdoor unit of an air conditioner comprises an air conditioner box 11, an external rotor motor 14 disposed in the air conditioner box 11, and fan blades 16 disposed on a shaft extension of the external rotor motor 14. The external rotor motor 14 is any one of the external rotor motors described in Examples 1-5, and no need to illustrate herein.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. An external rotor motor, comprising:
a rotary shaft;
a plastic-packaged stator, the plastic-packaged stator comprising a sleeve base, two bearings, a stator core, a terminal insulator, coil windings, and a plastic-packaged body; the stator core comprising an axle hole having an inner axle-hole wall; the sleeve base comprising a sleeve-base through hole, two bearing housings, a sleeve portion comprising an outer sleeve-portion wall having a plurality of sleeve-portion bulges and a plurality of sleeve-portion grooves, and a flanging portion comprising a flanging-portion step having a plurality of flanging-portion bosses and a plurality of flanging-portion grooves; and
an external rotor comprising a chamber;
wherein:
the plastic-packaged stator is disposed in the chamber of the external rotor;
the terminal insulator is disposed on two end surfaces of the stator core;
the coil windings are coiled on the terminal insulator; the sleeve portion of the sleeve base is disposed in the axle hole of the stator core;
the plastic-packaged body integrates the sleeve base, the stator core, the terminal insulator, and the coil windings;
a plastic-packaged end plate is disposed on the plastic-packaged body on one side of the stator core;
the plurality of sleeve-portion grooves and the plurality of sleeve-portion bulges are alternately disposed on the outer sleeve-portion wall;
the plurality of sleeve-portion bulges abuts against the inner axle-hole wall;
the plurality of sleeve-portion grooves extends radially inward from the plurality of sleeve-portion bulges;
the flanging portion is disposed on one end of the sleeve portion and extends radially outward from the outer sleeve-portion wall, and the flanging-portion step is formed between the flanging portion and the sleeve portion;
the plurality of flanging-portion bosses and the plurality of flanging-portion grooves are alternately disposed on the flanging-portion step;

the plurality of flanging-portion bosses abuts against one of the two end surfaces of the stator core;
the plurality of flanging-portion grooves extends from the plurality of flanging-portion bosses in a direction away from the sleeve portion;
each of the plurality of flanging-portion grooves aligns with one of the plurality of sleeve-portion bulges, and each of the plurality of flanging-portion bosses aligns with one of the plurality of sleeve-portion grooves;
the two bearing housings are respectively disposed on two ends of the sleeve-base through hole, and the two bearings are respectively disposed in the two bearing housings;
the rotary shaft is disposed in the sleeve-base through hole, and two ends of the rotary shaft are respectively supported by the two bearings; and
two ends of the rotary shaft protrude outwards from the sleeve base, respectively; one end of the rotary shaft is inserted in the chamber and is connected to the external rotor, and the other end of the rotary shaft protrudes outwards from a center hole of the plastic-packaged end plate to form a shaft extension connected to a load.

2. The motor of claim 1, wherein a plurality of mounting feet is disposed on an edge of the plastic-packaged end plate; the mounting feet comprise mounting holes; an annular lug boss is disposed on a center of a top surface of the plastic-packaged end plate; the rotary shaft protrudes outwards from a center of the annular lug boss; a plurality of first reinforcing ribs is disposed on the top surface of the plastic-packaged end plate; one end of each first reinforcing rib is connected to an outer edge of the annular lug boss, and the other end thereof is connected to a top surface of the mounting feet.

3. The motor of claim 2, wherein a circular flanging is disposed on an outer edge of a bottom surface of the plastic-packaged end plate; and the circular flanging is sleeved on a top of the external rotor.

4. The motor of claim 3, wherein a mounting portion is disposed at an outer edge of the plastic-packaged end plate, and the mounting portion is configured to mount a buffer ring; the mounting portion comprises a plurality of the mounting feet, and the mounting feet are circumferentially arranged at intervals, or the mounting portion is a circular flange.

5. The motor of claim 2, wherein the stator core comprises a plurality of laminated punching sheets; the laminated punching sheets each comprise a circular yoke, and a plurality of first tooth portions and second tooth portions on an outer edge of the circular yoke; the first tooth portions and the second tooth portions are circumferentially arranged at intervals; the second tooth portions each comprise a tooth root, a first curved tooth, a straight tooth, and a second curved tooth; the first curved tooth, the straight tooth, and the second curved tooth extend out from the tooth root; the straight tooth is configured to separate the first curved tooth from the second curved tooth, and first winding slots are formed there between; second winding slots are formed between each second tooth portion and an adjacent first tooth portion; a depth of the first winding slots along a radial direction of the laminated punching sheets is smaller than a depth of the second winding slots along the radial direction of the laminated punching sheets; and a width of the tooth root is greater than a width of the straight tooth.

6. The motor of claim 5, wherein the first curved tooth and the second curved tooth each comprise a baffle portion extending towards the straight tooth at an opening of the first winding slots; a notch is formed between the baffle portion and the straight tooth; the notch is in the vicinity of the straight tooth; middle parts of side surfaces of the first curved tooth and the second curved tooth are circular arc; and the tooth root of the second tooth portions comprises a segment of the straight tooth.

7. The motor of claim 5, wherein slot bottoms of the second winding slots are circular arcs, a center of which is a center of the laminated punching sheets.

8. The motor of claim 2, wherein the external rotor motor further comprises a thermostat and a fixing frame; the fixing frame comprises an annular portion and a clamping portion; the clamping portion bulges outwards from the annular portion; a cylindrical body is disposed in a center of the terminal insulator; the annular portion is sleeved on the cylindrical body, and the clamping portion is disposed on the coil windings; and the thermostat is disposed on the clamping portion and is in the vicinity of the coil windings.

9. The motor of claim 8, wherein the clamping portion is provided with mounting slots; the thermostat is mounted in the mounting slot; a bottom of the mounting slot is a through hole, and the thermostat is in the vicinity of the coil windings; the clamping portion is provided with a fixing block; the fixing block is configured to fix the thermostat in the mounting slot; two sides of the clamping portion are provided with slots, and a top surface of the terminal insulator is provided with cylinders; and the cylinders are secured to the slots.

10. The motor of claim 8, wherein a plurality of positioning blocks is disposed on the top surface of the terminal insulator; fixing grooves form between two positioning blocks, and the fixing grooves are configured to fix enameled wires; part of the positioning blocks are circumferentially arranged along a periphery of the cylindrical body, and the annular portion is configured to fix the enameled wires in the vicinity of the cylindrical body in the fixing grooves; a plurality of bumps is disposed on an outer edge of the top surface of the terminal insulator, and the bumps are configured to limit the coil windings within a range of the stator core.

11. The motor of claim 2, wherein the sleeve base is metal material; the sleeve base is disposed in the axle hole and matches with an inner wall of the axle hole; the bearing is disposed in the sleeve base, and at least part of the bearing is inserted in the axle hole in a center of the stator core.

12. The motor of claim 2, wherein a mounting portion is disposed at an outer edge of the plastic-packaged end plate, and the mounting portion is configured to mount a buffer ring; the mounting portion comprises a plurality of the mounting feet, and the mounting feet are circumferentially arranged at intervals, or the mounting portion is a circular flange.

13. The motor of claim 1, wherein the stator core comprises a plurality of laminated punching sheets; the laminated punching sheets each comprise a circular yoke, and a plurality of first tooth portions and second tooth portions on an outer edge of the circular yoke; the first tooth portions and the second tooth portions are circumferentially arranged at intervals; the second tooth portions each comprise a tooth root, a first curved tooth, a straight tooth, and a second curved tooth; the first curved tooth, the straight tooth, and the second curved tooth extend out from the tooth root; the straight tooth is configured to separate the first curved tooth from the second curved tooth, and first winding slots are formed there between; second winding slots are formed between each second tooth portion and an adjacent first tooth portion; a depth of the first winding slots along a radial direction of the laminated punching sheets is smaller than a depth of the second winding slots along the radial direction of the laminated punching sheets; and a width of the tooth root is greater than a width of the straight tooth.

14. The motor of claim 13, wherein the first curved tooth and the second curved tooth each comprise a baffle portion extending towards the straight tooth at an opening of the first winding slots; a notch is formed between the baffle portion and the straight tooth; the notch is in the vicinity of the straight tooth; middle parts of side surfaces of the first curved tooth and the second curved tooth are circular arc; and the tooth root of the second tooth portions comprises a segment of the straight tooth.

15. The motor of claim 13, wherein slot bottoms of the second winding slots are circular arcs, a center of which is a center of the laminated punching sheets.

16. The motor of claim 1, wherein the external rotor motor further comprises a thermostat and a fixing frame; the fixing frame comprises an annular portion and a clamping portion; the clamping portion bulges outwards from the annular portion; a cylindrical body is disposed in a center of the terminal insulator; the annular portion is sleeved on the cylindrical body, and the clamping portion is disposed on the coil windings; and the thermostat is disposed on the clamping portion and is in the vicinity of the coil windings.

17. The motor of claim 16, wherein the clamping portion is provided with mounting slots; the thermostat is mounted in the mounting slot; a bottom of the mounting slot is a through hole, and the thermostat is in the vicinity of the coil windings; the clamping portion is provided with a fixing block; the fixing block is configured to fix the thermostat in the mounting slot; two sides of the clamping portion are provided with slots, and a top surface of the terminal insulator is provided with cylinders; and the cylinders are secured to the slots.

18. The motor of claim 16, wherein a plurality of positioning blocks is disposed on the top surface of the terminal insulator; fixing grooves form between two positioning blocks, and the fixing grooves are configured to fix enameled wires; part of the positioning blocks are circumferentially arranged along a periphery of the cylindrical body, and the annular portion is configured to fix the enameled wires in the vicinity of the cylindrical body in the fixing grooves; a plurality of bumps is disposed on an outer edge of the top surface of the terminal insulator, and the bumps are configured to limit the coil windings within a range of the stator core.

19. The motor of claim 1, one end of an outer side of the sleeve base in the vicinity of the plastic-packaged end plate is provided with a plurality of second reinforcing ribs in a radial direction; and the plastic-packaged body is sleeved on the second reinforcing ribs.

20. The motor of claim 19, wherein two adjacent second reinforcing ribs form a pair of second reinforcing ribs, and the pair of second reinforcing ribs is V-shaped; a connecting member is disposed between the two adjacent second reinforcing ribs and on one end of the sleeve base; the connecting member is configured to connect the two adjacent second reinforcing ribs; and the second reinforcing ribs protrudes out from an outer side surface of the stator core along the radial direction.

21. The motor of claim 20, wherein the second reinforcing ribs are bended from an end surface of the sleeve base; and the sleeve base is cast from aluminum.

22. The motor of claim 1, wherein the sleeve base is metal material; at least part of each of the two bearings is inserted in the axle hole of the stator core.

23. The motor of claim 22, wherein:
the sleeve base comprises a first sleeve base and a second sleeve base, wherein each of the first sleeve base and the second sleeve comprises the sleeve-base through hole, the sleeve portion, and the flanging portion; the two bearing housings are disposed on one end of the sleeve-base through hole in the first sleeve base and one end of the sleeve-base through hole in the second sleeve base, respectively;
the first sleeve base and the second sleeve base are disposed at two ends of the axle hole, respectively;
the plurality of flanging-portion bosses in the first sleeve base abuts against one of the two end surfaces of the stator core, and the plurality of flanging-portion bosses in the second sleeve base abuts against the other of the two end surfaces of the stator core; and
part of the plastic-packaged body is configured to fix the flanging portion of the first sleeve base and the second sleeve base on the two end surfaces of the stator core.

24. The motor of claim 22, wherein part of the plastic-packaged body is configured to fix the flanging portion on one of the two end surfaces of the stator core.

25. The motor of claim 1, wherein a mounting portion is disposed at an outer edge of the plastic-packaged end plate, and the mounting portion is configured to mount a buffer ring; the mounting portion comprises a plurality of mounting feet, and the mounting feet are circumferentially arranged at intervals, or the mounting portion is a circular flange.

26. An air conditioner, comprising the external rotor motor of claim 1 and a plurality of fan blades that is connected to the shaft extension of the external rotor motor.

27. The air conditioner of claim 26, wherein a plurality of mounting feet is disposed on an edge of the plastic-packaged end plate; the mounting feet comprise mounting holes; an annular lug boss is disposed on a center of a top surface of the plastic-packaged end plate; the rotary shaft protrudes outwards from a center of the annular lug boss; a plurality of first reinforcing ribs is disposed on the top surface of the plastic-packaged end plate; one end of each first reinforcing rib is connected to an outer edge of the annular lug boss, and the other end thereof is connected to a top surface of the mounting feet.

* * * * *